(12) United States Patent
Kushler et al.

(10) Patent No.: US 7,098,896 B2
(45) Date of Patent: Aug. 29, 2006

(54) SYSTEM AND METHOD FOR CONTINUOUS STROKE WORD-BASED TEXT INPUT

(75) Inventors: Clifford A. Kushler, Lynnwood, WA (US); Randal J. Marsden, Kaysville, UT (US)

(73) Assignee: ForWord Input Inc., Lynnwood, WA (US)

( * ) Notice: Subject to any disclaimer, the term of this patent is extended or adjusted under 35 U.S.C. 154(b) by 470 days.

(21) Appl. No.: 10/346,366

(22) Filed: Jan. 16, 2003

(65) Prior Publication Data

US 2004/0140956 A1    Jul. 22, 2004

(51) Int. Cl.
*G09G 5/00* (2006.01)
(52) U.S. Cl. .................. 345/168; 345/173; 715/863
(58) Field of Classification Search ............ 345/168, 345/169, 173; 715/773, 863, 864
See application file for complete search history.

(56) References Cited

U.S. PATENT DOCUMENTS 5,574,482 A  *  11/1996   Niemeier ................... 345/173
5,748,512 A  *   5/1998   Vargas ...................... 708/142
6,008,799 A  *  12/1999   Van Kleeck ............... 345/173

OTHER PUBLICATIONS

Shumin Zhai, Samples of User Interface Research: Text Input, Laws of Movement, and Eye-Tracking Based Interaction, Department of Computer and Information Science, Sep. 18, 2002, Linkoping University, Linkoping, Sweden, slides 1,8,9.

Per-Ola Kristensson, Design and Evaluation of a Shorthand Aided Soft Keyboard, Dept. of Computer & Information Science, Linkoping University, Sweden, Aug. 2002, pp. 1-97.

Shumin Zhai, Samples of User Interface Research: Text Input, Laws of Movement, and Eye-Tracking Based Interaction, Department of Computer and Information Science, Sept. 18, 2002, Linkoping University, Linkoping, Sweden, slides 1,8,9.

* cited by examiner

*Primary Examiner*—Jimmy H. Nguyen
(74) *Attorney, Agent, or Firm*—Black Lowe & Graham PLLC

(57) ABSTRACT

A method and system of inputting alphabetic text having a virtual keyboard on a touch sensitive screen. The virtual keyboard includes a set of keys where an each letter of alphabet is associated with at least one key. The present invention allows someone to use the virtual keyboard with continuous contact of the touch sensitive screen. The user traces an input pattern for word by starting at or near the first letter in a decided word and then tracing through or near each letter in sequence. The present invention then generates a list of possible words associated with the entered part and presents it to user for selection.

51 Claims, 17 Drawing Sheets

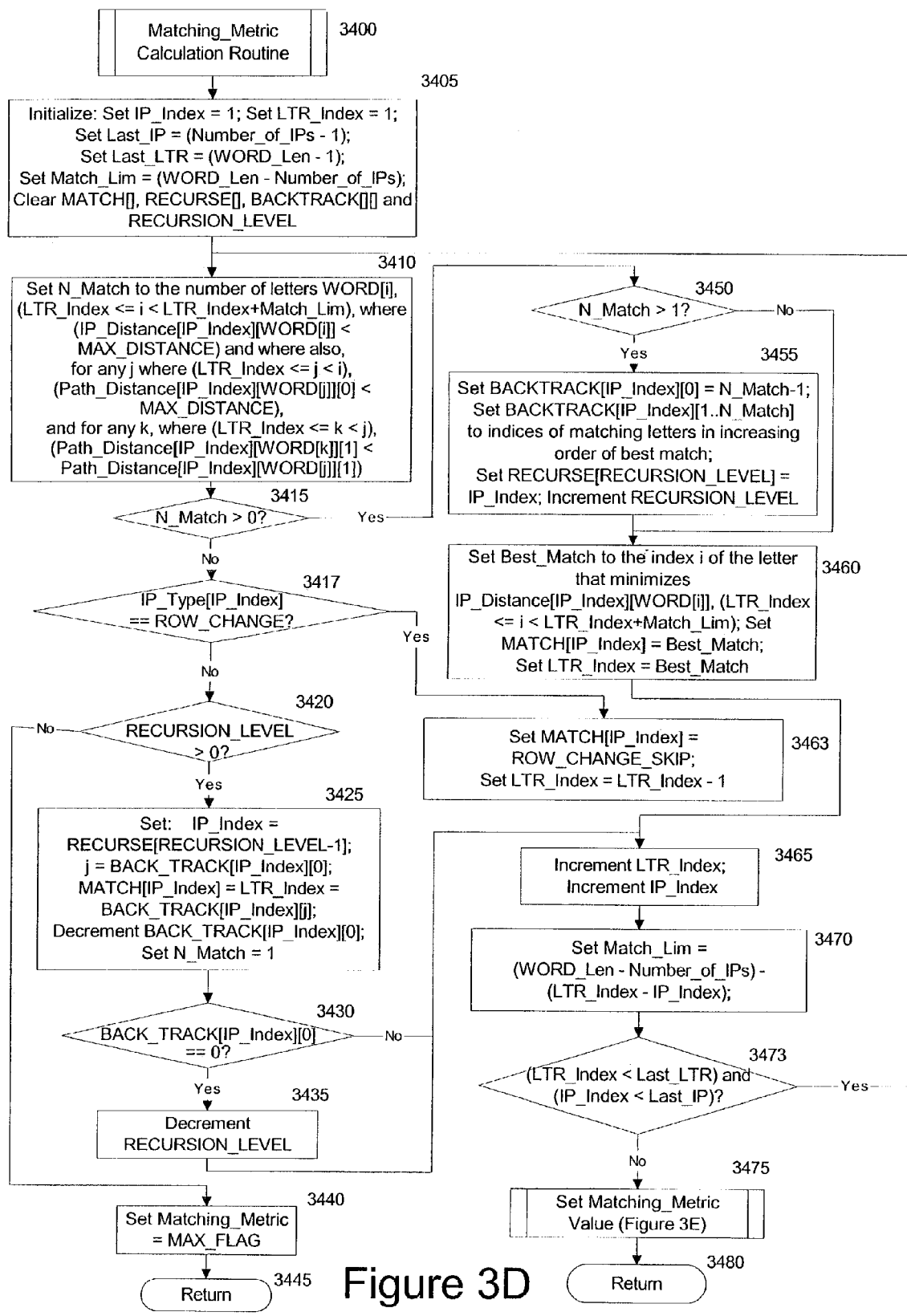

SYSTEM AND METHOD FOR CONTINUOUS STROKE WORD-BASED TEXT INPUT

FIELD OF THE INVENTION

The invention relates to a text input system and, more specifically, to a touch screen text input system.

BACKGROUND OF THE INVENTION

The origin of the modern keyboard as the primary method for inputting text from a human to a machine dates back to early typewriters in the 19th century. As computers were developed, it was a natural evolution to adapt the typewriter keyboard to use as the primary method for inputting text. For a skilled typist, it has remained the fastest way possible to input text into the computer.

With ongoing efforts to make computers smaller and more portable, the physical keyboard has become one of the most significant limiting factors in just how small a device can become: the physical size of the human finger is not something computer designers could change. As a result, computers for certain portable applications have been designed without a physical keyboard, and use touch-screen based input methods as the primary form of human computer interface. (This is also the case for some applications where people are physically unable to use a keyboard, such as persons with physical disabilities.)

There are two primary requirements for touch-screen input methods which frequently conflict with each other. The method of input must be as fast as possible and at the same time the method of input must take as little of the display screen as possible. Unfortunately, as the space taken up for input on the display screen is decreased, it becomes difficult to increase speed without adversely affecting accuracy.

In spite of a recent surge in the market for pen-based computing devices, most people who must generate text still do so with a standard keyboard. In fact, an entire industry has sprung up that provides portable keyboards for pen-based computers that were designed to be keyboard-less! To date, pen-based computing has not replaced conventional portable laptop computers as was originally forecast, for the simple reason that text input on pen-based computers is too slow. Even the recently introduced "Tablet PC," largely due to the lack of a sufficiently accurate handwriting recognition engine, serves largely as a way to store and retrieve "digital ink"—actual graphic images of handwriting traced on the touch-screen by the user—as opposed to recognizing what was handwritten and converting to computerized text.

Analogous to one-finger typing, the current state-of-the art for inputting using a virtual keyboard is called "point and tap". A stylus is moved from letter to letter and pressed down on the desired key to select it. This results in the need to always lift and set down the stylus, slowing input. Cursive handwriting was invented to allow a better (and faster) flow from letter to letter and reduce the number of pen (or quill) lifts. In a similar way, the current invention reduces the number of taps required when inputting using an on-screen keyboard, thus speeding text entry.

The natural way for a human to create text on anything other than a machine is to "write" it by hand. Accordingly, with the advent of touch-screen computers, it is not surprising that handwriting recognition software was developed to allow a user to enter text by writing on the screen of the computer. However natural, handwriting is slow. Each letter requires several strokes of the stylus, making it very inefficient. Further, with varying handwriting styles, accuracy of this software is still below user-acceptance levels (see MacKenzie, I. S., & Chang, L. (1999), A performance comparison of two handwriting recognizers. Interacting with Computers, 11, 283–297.). As mentioned above, the reliance on the use of "digital ink" by even the "latest and greatest" of computer touch-screen technology, the Tablet PC, provides clear evidence that handwriting recognition is still not good enough to satisfy most users. Furthermore, even if a completely accurate method of handwriting recognition were available, handwriting itself is simply too slow and tiring (especially on a touch-screen) to provide a satisfactory input method.

Some methods make the job easier for the software by requiring the user to handwrite letters in a simplified way (see Goldberg, US Patent Application 20020009227, Unistrokes; or as popularized by Palm Computing in their commercial product titled "Graffiti"). Advantages of this method are that each character is sufficiently unique as to be easily recognized by the software, that each character is drawn as a single stroke, and no virtual keyboard is required on the screen. Disadvantages of this method are it requires the user to learn a new writing method and still requires the stylus to be set-down and lifted once for each individual character (thus slowing text entry).

Again, it was a natural evolution for the idea of a keyboard to be carried on into the virtual world of the computer display. Auer et al., in U.S. Pat. No. 4,725,694, describe a system wherein one or more images of simulated keyboards are displayed on a touch-sensitive screen of a computer, and in response to the touching of the simulated keys, generate appropriate control signals. In a later refinement of this concept, the image of the keyboard is displayed floating above other applications running on the computer, rather than occupying a dedicated portion of the screen. The user interacts with this "on-screen keyboard" or "virtual keyboard" by either directing a cursor pointer over it, or directly touching the keys via a touch screen using a finger or stylus. On-screen keyboards have been primarily used for devices which lack a standard keyboard, such as certain public information kiosks and personal digital assistants (PDAs), handheld computers that are too small to accommodate a physical keyboard. They are also frequently used by individuals with disabilities that prevent them from using a physical keyboard.

There are two large shortcomings of on-screen keyboards: first they take up valuable screen space on the computer needed for whatever task is requiring text input. Second, and more importantly, they are slow because the user is forced to tap one letter at a time—effectively reducing the user to input text in a way that is analogous to single finger typing on a regular physical keyboard.

In an effort to address the slow rate of typing with on-screen keyboards, predictive software was developed which, based on preceding words and on the initial letters typed for the current word, attempts to predict what word is being typed and presents the user with a list of word or phrase choices that they can select as a quicker alternative to completing the word or phrase letter by letter. Due to the need to divert attention from the task at hand (typing) in order to scan the prediction list and determine whether the intended word has been offered as a choice, this "Word Prediction" scheme offers only a marginal increase in speed of text entry, if any (depending on the user).

As the size of the on-screen keyboard is reduced beyond a certain point, the speed of text entry is sharply reduced. This is due to the requirement for increased accuracy and dexterity in hitting the smaller targets. Various schemes have been developed to minimize the size of the keyboard, yet still maintain accuracy without unduly sacrificing speed of entry.

Grover et al., in U.S. Pat. No. 5,818,437, describe a system that reduces the number of distinct keys required by assigning multiple letters on each key. This allows, for a given size of keyboard, relatively larger individual keys which are therefore easier to hit accurately, thus allowing the user to type more quickly. Text entry in this system is word-based, so that disambiguation software uses a database of words to analyze each sequence of keystrokes and determine the most likely word (or words) corresponding to the sequence, and consequently determine which letter was actually intended by each ambiguous keystroke. While the system of Grover et al. makes it easier to hit an intended key by virtue of reducing the total number of keys and enlarging the individual keys, when implemented on a touch-screen device, it still requires the user to lift the stylus and set it down for each letter entered, significantly slowing down text entry. Furthermore, this approach requires the user to a very unfamiliar keyboard layout in which completely unrelated letters are grouped together on a single key. Even when letters are grouped according to an "alphabetic" layout (as on the keys of cellular telephone), compared to the standard "QWERTY" keyboard, the arrangement is unfamiliar for the majority of individuals and further slows the text entry process.

Lee, in U.S. Pat. No. 6,292,179, describes another system that reduces the number of distinct keys required on a touch screen keyboard by assigning multiple letters on each key, and determining which letter associated with a contacted key is intended by determining the direction in which the stylus is moved after contacting a key. Each letter associated with a key is further associated with a range of directions in which the point of contact can be moved. Lee's method also allows each key of a given keyboard to be relatively larger, and therefore easier to initially contact, since multiple letters are combined into a single key and a smaller total number of keys is therefore required. However, the user is still required to tap once for each desired letter, and is further required to move the point of contact in a particular direction before lifting the stylus and breaking contact with the screen.

Kaehler, in U.S. Pat. No. 5,128,672, describes another system designed to reduce the number of distinct keys that are required for a touch screen keyboard by displaying at any given time only a subset of the total set of characters that can be entered. The system attempts to determine the subset of characters comprising the most likely next characters to be entered, based on the previous character entered or the positioning of the text insertion point. When the desired character does not appear, the user must manually switch to a different keyboard to locate and enter the desired character. The large number of different (and constantly changing) partial keyboards would tend to make this a slow and frustrating input method for the majority of users.

Vargas, in U.S. Pat. No. 5,748,512, attempted to reduce the need for accuracy on a touch screen keyboard (and therefore increase speed) by considering two adjacent keys as possible candidates when a key is not activated in its central area. Based on the actual location at which the keyboard was contacted relative to the three keys, combined with the statistical analysis of preceding characters in the word being entered (if any), and optionally also using information from a word prediction engine, the system determines the most likely of the three possible candidate characters and displays it as the character to be input in response to the activation. However, since each character, once input, forms the basis for the prediction of subsequent characters, when a character prediction is incorrect, it must be corrected by the user before the can proceed to type the next character. In the system as described, this is done by maintaining contact with the keyboard during an activation, observing whether the predicted character is correct, and if necessary, sliding the point of contact in the direction of the actual intended letter. The advantage of this invention, as described, is that it enables the user to use something blunt (such as a fingertip, rather than a stylus) to activate keyboard keys that are actually smaller than the instrument of activation. However, the nature of the feedback provided to the user and the consequent need to observe the result of each keystroke and correct it before moving on to the next keystroke, creates a system that generally would slow the rate of text input considerably.

Robinson et al., in international patent publication WO 00/74240 A1, describe a text input system for touch-screen devices that includes a keyboard with an auto-correcting region that includes the set of keys that are associated with letters. The advantage of the system is that, for words that are included in the system database, the user does not need to contact within the region of the key associated with desired letter, but instead need only tap in the neighborhood of the key. The user taps the keyboard once for each letter in the word being entered, and the system records the location of each contact. The sequence of contacts is then compared with the key locations associated with words in the database, and the most likely one or more matching words are presented to the user for selection. This system is a significant improvement over previous approaches in that it enables the user to type much more quickly on a small keyboard because it is no longer necessary to precisely contact within the region of each intended key. However, for each key activation, the user still needs to touch down on the screen with control, targeting the intended key, then lift the stylus from the screen and move to target the next key. The additional movements of lifting and setting down the stylus for each letter, combined with the additional effort required to control the relocation of the stylus when it is not in contact with the screen, result in significantly slowing down the input process compared to the system of the present invention.

Another factor in slowing text entry on touch-screen keyboards was the time it takes to lift the stylus from the screen and then bring it back down between each key selection ("tapping"). U.S. Pat. No. 5,574,482 (Niemeier) discloses a method for data input on a touch sensitive screen. The Niemeier patent teaches having what are described as computer generated "temporary" adjacent keys which can be made to appear on top of a standard keyboard layout. When the user touches a key, selecting a first letter, one or more temporary keys are displayed adjacent to the contacted key as long as the initial contact is maintained. A second letter (or group of letters) that is displayed on an adjacent temporary key can then be selected by making what is described as a "wiping" motion in which one's finger or a stylus is slid from the first selected key to the adjacent temporary key. This teaching enables two (or more) adjacent letters to be input without lifting the stylus from the screen, approximately cutting in half the number of times the stylus needs to be lifted from the touch screen. The "temporary" adjacent keys create artificial groupings of the most probable letters to provide more opportunity for "wiping" input.

However, the method described by Niemeier has several significant drawbacks. One is that the user needs to either memorize 26 new "temporary" sub-keyboards that appear when each of the 26 letter keys are contacted (creating a significant learning curve in order to use the system effectively), or else the user needs to pause to observe whether and where the next desired key may have appeared on a temporary key, which would likely negate any speed advantage that the "tap and slide" method would provide. The situation becomes worse when, in order to increase the likelihood that the desired letter will appear, a dictionary or other database is used to alter the temporary keys that are displayed for each key based on the context of the previous letters that that were selected prior to activating the key. Furthermore, as described above, the system is limited to sliding to at most one additional key beyond the initially selected key, unless the subsequent letter also happens to appear on a key adjacent to the selected temporary key. Also, the number of temporary keys that can be displayed (and therefore selected) is limited to the number that can be displayed around the circumference of a single key (six for standard key arrangements as proposed by Niemeier, up to a maximum of eight). Furthermore, since the temporary keys are only displayed while the stylus (or finger) is actually in contact with the screen, a significant number of the keys which might be displayed would likely be partially or totally obscured by the stylus and hand of the user. Also, the system proposed by Niemeier includes a significant amount of space in between active keys (used for capitalization and spacing), reducing the size of the actual key targets, each of which must be contacted in the interior of the defined key area in order to effect an activation.

Van Kleeck, in U.S. Pat. No. 6,008,799, describes a somewhat similar system, wherein the "temporary keys" are never actually displayed, but where each of the four vowels "o", "e", "i" and "a" are implicitly associated with each letter key, and can be appended by tapping a character button and dragging the pen in either the north, south, east or west direction. While this approach is easier to learn than Niemeier's (since only the four vowels and their associated directions must be learned), and it is not affected by potential visual interference by the user's hand (since no temporary keys are actually displayed), it is limited to only being able to add one of the four particular letters following a key selection, and thus does not offer a very significant improvement over a standard keyboard.

Perlin describes a method in U.S. Pat. No. 6,031,525 where the stylus is never lifted from the touch screen, but rather directed from a middle neutral point (a "resting zone" in Perlin's terminology) to one of a number of surrounding zones, each of which contains a plurality of letters. The user is required to contact the screen in the resting zone and then perform a continuous sliding motion which, for each letter to be entered, goes from the resting zone out into the adjacent zone that contains the desired character, and then indicates which character contained in the zone is intended by either returning directly to the resting zone or by first traveling to a different zone before returning to the resting zone. Thus, the desired character is indicated by the combination of the zone first entered from the resting zone, combined with the zone from which the resting zone is again re-entered. As a result, the user is required to make a minimum of 2 and more commonly 3 strokes of the stylus to indicate each desired letter. This method allows for a smaller keyboard, but requires multiple strokes per letter which dramatically reduces the speed of text entry.

Another common approach in speeding text entry is to modify the layout of characters on the keys of an on-screen keyboard (see www.fitaly.com). Common letters are placed near the center of the onscreen keyboard, and common letter pairs are made adjacent. In this way, stylus movement between letters is minimized, thus speeding text entry. The disadvantage of this method is it requires the user to learn a new keyboard layout, and again, the user is still required to lift the stylus between each key activation, essentially reducing the user to a one-finger typist.

Each of the above methods has the potential to speed text entry by some degree and/or decrease the amount of on-screen real estate required for input. However, text entry via existing on-screen keyboards and handwriting recognition techniques are still generally slower than using a physical keyboard. Handwriting itself is simply too slow, and the recognition accuracy is still not up to acceptable standards. All of the keyboard-based methods described above require one or more separate and distinct actions for the input of each individual letter. Most of the proposed keyboard systems are based on tapping some type of key, so that generating a single character requires that the stylus be appropriately positioned, the on-screen keyboard be contacted, and the stylus lifted from the screen again before proceeding to input the next character.

The fundamental problem is that, particularly for devices that must utilize touch-screen keyboards that are reduced in size, the additional actions of lifting the stylus and bringing it back into contact with the screen in a controlled manner considerably slow down the input process. Other methods which have been proposed to reduce the number of times the stylus must be lifted from the screen (such as Niemeier and Perlin) still fail to provide a method that can significantly speed text entry. Niemeier's proposed system adds too much complexity by requiring the user to react to a constantly changing keyboard layout, and limits the number of characters that can be selected following an initial character selection. Perlin's approach fails because it requires the user to execute too many distinct stylus movements to enter each letter.

SUMMARY OF THE INVENTION

The method of the present invention is distinguished by the fact that a word is input using one continuous motion in contacting the screen, significantly reducing the number of controlled movements that must be executed to input each word. This significantly increases text entry speed. The present invention uses word-level analysis to match the input pattern traced out on the keyboard with the most likely word or words in the system's database. The user is presented with a list of the identified matching words, and can either accept the default choice (the word identified by the system as being the most likely match), or select one of the alternate word choices or request the system to display further potentially matching words if the desired word does not appear in the list. When a word is selected for output immediately following a previously output word, the system automatically outputs a space prior to outputting the selected word, eliminating the need to perform any additional action for the vast majority of space characters typed. The system also includes a simple and straightforward alternate method to input new words not yet present in the system database and have them automatically added to the database for future input using the continuous stroke method.

The method of the present invention has a number of very significant advantages over prior systems such as those disclosed by Niemeier and Perlin. One is that the keyboard displayed by the system stays constant, with the same letters always appearing in the same positions. This is in contrast with the system proposed by Niemeier, in which differing sets of temporary keys appear each time the screen is contacted, forcing the user to observe and react to a dynamically changing layout. In addition, this allows the method of the present invention to be used with a static keyboard that is imprinted on a less-costly touch-sensitive membrane rather than a touch-sensitive dynamic display. A second advantage is its great economy of movement. The stylus need only be brought into contact at the start of each word, and lifted at the end of each word. As will be described below, in the vast majority of cases no additional action whatsoever is required to correctly generate a space between each generated word. Furthermore, in contrast to the system of Perlin, the stylus need only be moved directly from letter to letter of the word being input, rather than having to perform two to three distinct strokes for each letter. A third advantage is that, like the system of Robinson, the individual letters of a word need not be contacted precisely with the stylus. The stylus need only be brought into the neighborhood of each letter in sequence, and need not necessarily pass directly through the region defined for the key associated with the letter. The system allows the user to be proportionately less precise (and consequently, to move the stylus more quickly) when inputting a word with a relatively higher frequency of use. This greatly increases the overall speed of input, since it enables to user to input most quickly those words that tend to be used most often.

The present invention provides a keyboard text entry system for devices with touch-sensitive input panels or touch-sensitive display screens. More specifically, the present invention provides a system and method that enables the user to enter text word-by-word using a keyboard displayed or printed on a touch-sensitive screen, wherein contact with the surface of the display generates input signals to the system corresponding to the location of contact. The user enters a word by contacting the screen and tracing out a continuous pattern that passes through or near each letter of the word in sequence, and breaking contact with the screen when the last letter of the word is reached. In another aspect, the keyboard is displayed on a touch-sensitive display screen (hereinafter referred to as a touch-screen) and the user contacts the display by means of a stylus. It should be understood, however, that the system can be applied to any system where the user can trace out a continuous path on a displayed keyboard, for example, a touch-sensitive screen that is contacted with the user's finger, or even a standard computer display monitor (not a touch-sensitive screen) where the point of "contact" is the location of an on-screen cursor whose location on the display is controlled by a mouse (or equivalent control device) and where the acts of "contacting" and "breaking contact with" the screen are indicated by closing and opening a switch (or performing some other equivalent control action, such as "dwelling" near a location without moving the mouse for a period of time longer than a selected threshold). The operation of the system will be described with reference to an aspect comprising a touch-screen contacted by a stylus, but this should not be construed as limiting the scope of the invention, but simply as a means to provide illustrations of some of the present aspects of this method.

The system of the present invention allows the user to input a word of text without having to set the stylus down on the screen to contact an intended letter and then lift the stylus from the screen to contact the next letter—i.e., without having to "tap" each letter. This enables the user to input text much more quickly, since the extraneous movements of lifting and setting down the stylus need not be performed, and since maintaining contact between the stylus and the screen makes it easier in general to maintain more precise control over the location of contact by helping to stabilize the relationship between the stylus and the screen. Furthermore, in general it allows the displayed keyboard as a whole to be significantly reduced in size, since the path traced out by the user need not precisely contact each letter of the intended word. To the extent that the keyboard is not significantly reduced in size, speed of entry tends to be able to be correspondingly increased.

The path traced out on the touch-screen by the user and recorded by the system for analysis is referred to as the input pattern. As the user traces out an input pattern on the touch-screen, the system records the sequence of points of contact detected by the touch-screen controller hardware. As the input pattern is recorded, it is processed by an input pattern analysis component. The input pattern analysis component extracts the data needed by the pattern matching component, which compares the extracted data with words in a database to identify a list of one or more words determined to be the most likely matching candidate words. One or more of these identified words are presented to the user for selection, and a selected word is added to the text being entered by the user.

In another aspect, the text input system includes: a keyboard implemented on a touch-sensitive display screen, where the location of each displayed text character key is defined by the screen coordinates of the center of the key, which is the location used when determining the distance of the letter associated with the key from any point on the input pattern; a record of the input pattern consisting of the coordinate locations of the sequence of points of contact detected from the first location of contact through the location at which the stylus was lifted from the screen; a routine to analyze the input pattern to determine the locations associated with one or more inflection points of one or more types, and to calculate the distance between each determined location and the locations associated with text character keys; a database of words that can be entered using the system; a routine to determine which words most closely match the determined locations of inflection points; and a means to allow the user to select the desired word from the set of words determined to be the most likely matching candidates. In another aspect, the distance of a letter associated with a key from a point on the input pattern is defined as zero when the point on the input pattern lies within the defined boundary of the key, and otherwise is defined as the distance from the point on the input pattern to the nearest point on the defined boundary of the key.

The term "letter" in the context of the present invention is to be understood to include any character that appears in the spelling of one or more words of the database. Thus, for example, if the word "can't" is among the words in the database of the system, it is possible to enter the word by tracing out a path that starts near the letter "c," passes through or near the letters "a" and "n," then through or near the key associated with the apostrophe, and ends near the letter "t." Similarly, hyphenated words, alphanumeric words, and other words containing special characters can all be included in the database and entered as text using the system of the present invention, providing that each of the characters used in the database is associated with at least one key on the keyboard.

In another aspect, the input pattern analysis component first applies a smoothing process to the recorded sequence of contact points to reduce the amount of "jitter" that may be introduced by any inconsistency in the touch-screen digitizer that reports the coordinate location of each recorded point of contact. Algorithms for smoothing a sequence of data points are well-known in the art, and any of a number of such algorithms can be employed for this purpose. The input pattern analysis component then analyzes the path to identify "inflection points" where the path changes direction in a significant fashion. Such inflection points can be detected and extracted through a variety of analysis methods, as explained below. In one alternate aspect, the methods by which various inflection points are detected are associated with varying levels of confidence that they should in fact be associated with the location of a key associated with a letter of the word being input, and additionally with various methods of weighting the distance of a key from the input path, wherein, for example, the horizontal and vertical distances of a key from the path may be differentially weighted. Thus, when the input pattern analysis determines that an inflection point is of a type wherein its location can be accurately determined and wherein there is a very high likelihood that the inflection point in fact corresponds to a letter of the word being input, potentially matching words in the database will be deemed more likely matches the closer the corresponding letter of the word is to the determined location. When an inflection point is determined to be of a less reliable type, then the likelihood determined for potentially matching words will be less affected by the distance of the corresponding letter from the inflection point.

In another aspect, the input pattern analysis component determines the sequence of first and second order differences (corresponding to rates of change) of the x- and y-coordinates of the sequence of points in the input pattern. The ratio of the x and y first order differences corresponds to the "slope" of the input pattern at each point, such that the second order difference corresponds to the rate of change in the slope. A second order difference hovering near zero corresponds to a segment of the input pattern which is a relatively straight line. A small, relatively constant second order difference indicates a constant rate of change in the slope corresponding to a segment of the input pattern which has a slight, constant curvature. A sharp peak or rapid change in the second order difference corresponds to a relatively sharp change in direction of the input pattern. In another aspect, since the magnitude of the first and second order differences is also a function of the frequency with which contact location data points are sampled and collected by the operating system as well as the speed at which the user is moving the point of contact, the first and second order differences at each point along the input path are calculated with respect to two points at a fixed distance preceding and following the given point along the input path. In another aspect, to simplify computational requirements, this fixed distance is approximated by a fixed sum of the absolute magnitude of the x- and y-first order differences. In yet another aspect, when the system detects that the input path has crossed over itself in a loop (as in the entry of a small circle in the entry of a DOUBLE_LETTER gesture, as defined below), the magnitude of the fixed distance used is reduced to approximately the radius of the loop, and the magnitude of the second order difference calculated is scaled according to the ratio of the standard fixed distance to the reduced fixed distance used.

In another aspect, the input pattern analysis component identifies up to five different types of inflection points in the input pattern: PEN_DOWN, the location where the stylus first makes contact with the touch-screen; PEN_UP, the location where the stylus breaks contact with the touch-screen; ANGLE_THRESHOLD, a location where the sum of the absolute magnitudes of the x and y second order differences reaches a local maximum, having exceeded a pre-determined minimum threshold; ROW_CHANGE, a location between two successive inflection points of other types where the y-coordinate reaches a maximum (or minimum) value that occurs in a row of the keyboard positioned above (or below) the row(s) in which the two successive inflection points inflection points are located; and TAP, a location where the stylus is more or less immediately lifted after contacting the screen, corresponding to a case of a one-letter word or the selection of a single function key.

In another aspect, the input pattern analysis component identifies more than one class of ANGLE_THRESHOLD inflection points, corresponding to a predetermined set of ranges into which the maximum value attained by the second order difference sum may fall. Alternatively, the maximum value attained by the second order difference sum is itself used in the function that applies differential weighting to distances associated with different inflection points. In another aspect, two or more different classes (or sub-classes) of ANGLE_THRESHOLD inflection points are determined according to the length of the input pattern path between the point where the second order difference first exceeds the pre-determined minimum threshold and the point where it again falls below the pre-determined minimum threshold. In general, a shorter length of this segment corresponds to a "sharper" angle, and a longer length of this segment corresponds to a "rounder" angle.

In another aspect, an additional type of inflection point is defined which corresponds to a predetermined type of stylus movement that the user is required to execute to indicate entry of a double letter (DOUBLE_LETTER). To illustrate this, consider the possible entry of the words "feel" and "fell." To enter either word, the user would contact the touch-screen at or near the key associated with the letter "f," pass through or near the key associated with the letter "e," move the stylus to or near the key associated with the letter "l," and lift the stylus from the screen. Without such a DOUBLE_LETTER inflection point type, these words could not be distinguished from each other with respect to an appropriately entered input pattern, forcing the user always to explicitly select one of the two word forms, since only one can be displayed as a default (automatically accepted) word choice. When a DOUBLE_LETTER inflection point type is included, a distinguishable movement would be performed at or near the key associated with the letter "e" in the case of the word "feel," but at or near the key associated with the letter "l" in the case of the word "fell," enabling the system to distinguish between the input patterns for the two words. In another aspect, the movement associated with a DOUBLE_LETTER inflection point type is a small circular motion of the stylus at or near the location of the key associated with the letter to be doubled. The location of a DOUBLE_LETTER inflection point is defined as the center of the small circle traced by the user. In another aspect, each successive additional repetition of the movement associated with a DOUBLE_LETTER inflection point denotes an additional occurrence of the letter in the word being entered. For example, the word "AAA" would be entered by contacting the screen at or near the key associated with the letter "a," executing two small circles with the stylus, and lifting the stylus from the touch-screen.

Depending on the relationship between the direction from which the double-letter key is entered and the direction in which the input path continues when leaving the key, it may be difficult for a user to determine how many repetitions of a "small circular gesture" have actually been performed. In yet another aspect, additional repetitions of the movement are processed by the system in the same fashion as a single performance of the movement. In this aspect, one or more repetitions of the movement are matched with any sequence comprising two or more consecutive occurrences of the same letter in a word, or two or more consecutive occurrences of alternative forms of the same letter. In yet another aspect, when a small loop is detected in the input pattern that does not complete a full 360° change in the slope of the input path, an alternate class of DOUBLE_LETTER2 inflection point is identified that is matched by the system both as an ANGLE_THRESHOLD inflection point and as a true DOUBLE_LETTER inflection point, choosing the appropriate interpretation for each evaluated candidate word that best matches the word. An example of such an inflection point can be found in entering the input paths for the words "fed" and "feed," where there may be ambiguity in whether the traced path was intended to contain a double letter gesture. The path may begin within the "f" key, proceed up and over to the "e" key, and depending on the user's habits in tracing an input path, the path may inadvertently loop over to the right and back down across itself in proceeding down to the "d" key. Assuming the path traverses the center of each key (an ideal path for correct recognition), the slope of the path changes by only about 220° between the entry into and exit from the "e" key. At the same time, this path may seem like a perfectly correct execution of a DOUBLE_LETTER gesture to a user who intends to enter the word "feed", since a small closed loop has been traced on the "e" key. In another aspect, a separate additive adjustment factor is calculated for use with a DOUBLE_LETTER2 inflection point when matched with a single vs. a double letter. A flag determines whether this adjustment factor is added to the Matching_Metric calculated for a candidate word when a DOUBLE_LETTER2 inflection point is matched with a single letter, or when it is matched with a double letter. When a small loop is traced by the user that does not complete a full 360° change in slope, and the word choice list contains words which match for both a single letter and a double letter, the system determines which of the two alternate words was selected for output by the user. When the user's selection appears lower in the selection list than the corresponding alternate word, an incremental change is made in the adjustment factor (and when necessary, the associated flag value) used for a DOUBLE_LETTER2 inflection point. This enables the system to better accommodate a user who habitually creates small loops at inflection points where the path "reverses" direction in both the x- and y-components, as in the current example. In another aspect, separate values of the flag and adjustment factor are calculated for different ranges in the number of degrees by which the slope changes in completing the loop gesture.

In another aspect, the input pattern analysis component analyzes the input pattern as the pattern is being input, so that the pattern matching component can begin to identify potentially matching candidate words with little or no delay once the stylus is lifted from the screen. The location at which the screen is first contacted is recorded within the system as the first detected inflection point, and is identified as an inflection point of type PEN_DOWN. In the case where the stylus is again lifted from the screen without being moving more than a threshold distance or remaining in contact with the screen for more than a threshold time period, this first inflection point is recorded as a solitary inflection point of type TAP. In an alternate aspect, as contact location data is received from the touch-screen controller, it is immediately processed through a smoothing algorithm to remove any jitter introduced by the touch-screen digitizer. The smoothed data is then used to calculate the first and second difference of the data stream in both the x- and y-coordinate. The stream of second difference data is then passed through a filter to determine when the sum of the absolute magnitudes of the x- and y-second differences exceeds any of the one or more thresholds determined for an inflection point of type ANGLE_THRESHOLD. Each time any such threshold is exceeded, an inflection point of type ANGLE_THRESHOLD is identified at the contact location determined by the data point at which sum of the absolute magnitudes of the second differences attains its maximum value prior to once again falling below the exceeded threshold. When the stylus is finally lifted from the touch-screen, the location at which the screen is last contacted is recorded within the system as the last detected inflection point, and is identified as an inflection point of type PEN_UP.

In another aspect, following the identification of the first PEN_DOWN inflection point, each time an additional inflection point is identified, the data from the previously identified inflection point up through the newly identified inflection point is analyzed to determine if an additional inflection point of type ROW_CHANGE can be identified. When the recorded input path segment between the previously identified inflection point and the newly identified inflection point traverses into a row of the keyboard that is above (or below) the row or rows containing the two identified inflection points, even though there is no ANGLE_THRESHOLD inflection point determined, there is a reasonable likelihood that the row into which the path segment traveled contains one or more letters of the word being entered. The system identifies the maximum (or minimum) height attained by the path segment and an inflection point of type ROW_CHANGE is identified at the corresponding location. In another aspect, the path segment is first re-analyzed to identify whether one or more inflection points of type ANGLE_THRESHOLD can be identified using a lower critical threshold for the second difference, since the circumstances provide additional evidence that one or more inflection points might be present along the path segment. If the lower threshold is not exceeded and no additional ANGLE_THRESHOLD inflection point is identified, then an inflection point of type ROW_CHANGE is identified as described above. An important distinction between an ANGLE_THRESHOLD and a ROW_CHANGE inflection point is that, in the pattern matching analysis performed, a ROW_CHANGE inflection point is not required to match a letter of a candidate word. In order to enable the user to enter text with the system at as fast a rate as possible, it is necessary to limit as much as possible the constraints placed on how an input path is to be drawn. The present invention facilitates this by allowing the user to wander from a straight path without a significant penalty in correct recognition performance. By following a reasonably straight path between letters that fall in the same row of the keyboard, and by being able to are smoothly up through keys in adjacent rows without having to introduce an unnatural and artificially "sharp" change in direction, both speed of entry and accuracy of recognition of input patterns is enhanced.

After the input pattern analysis component identifies the inflection points associated with an input pattern, the pattern matching component examines the words stored in the system database to determine which words are the most likely matching candidates. While the aspect described herein is a simple and computationally efficient method to identify which words of a database best match an input pattern, it is to be understood that other alternative approaches could achieve this goal, and should not be considered to be outside the scope of the present invention.

In another aspect, the words in the database are organized in a fashion to facilitate efficient searching by the pattern matching component. Since every input pattern has two easily and reliably identified inflection points—the first (PEN_DOWN) and the last (PEN_UP)—which are both always unambiguously matched with the first and last letters of the word being input, the words in the database are organized in groups according to the pair of keys which are associated the letters comprising the initial and final letter of each word. The pattern matching component simply identifies the set of keys that are located within a threshold distance from the PEN_DOWN inflection point, and the set of keys that are located within a threshold distance from the PEN_UP inflection point, and examines only those groups of words having initial and final letters associated with the identified sets of keys. In this way, the number of words in the database that must be evaluated is greatly reduced, allowing the system to run efficiently enough to be utilized even in devices with relatively low-powered processors.

Another characteristic of the input pattern that can be easily and reliably identified by the input pattern analysis component is the total length of the path of the input pattern. The length of the input path cannot be reliably associated with the length of a word in terms of the number of letters in the word, since a word could have a small number of widely separated letters (e.g. "ape") or a larger number of closely spaced letters (e.g. "deceased"). However, the average expected length for each word is easily calculated for any given keyboard layout and on-screen configuration. In an alternate aspect, the expected path length for a word is calculated as the sum of the distances between the centers of the keys associated with the letters of the word in sequence. In the example of the word "ape," this would be the sum of the distance from the "a" key to the "p" key, plus the distance from the "p" key to the "e" key. Since the expected path length is only an approximation of what to expect from an actual input pattern for a given word, in another aspect, the range of expected path lengths associated with the words of a database are divided up into a relatively small number of ranges, each such range being associated with a class of words whose expected path length falls into that range. The expected input path length class associated with each word can then be stored along with the word without significantly increasing the size of the database, or alternatively, words in the database can be stored in groups according to expected input path length class. In either case, the number of words that need to be examined in detail by the pattern matching component is greatly reduced since the actual length of the input pattern as measured by the input pattern analysis component is used by the pattern matching component to simply pass over words belonging to an expected input path length class that is significantly different. In an alternate aspect, the word selection component calculates a running average of the ratio of the actual measured length of the input pattern to the expected input path length class of the word selected for output, and the pattern matching component uses this ratio to determine which expected input path length classes will be examined for a given measured input pattern path length.

In another aspect, based on the expected input path length classes to be examined and the candidate pairs of initial and final letters determined for the current input pattern, the system determines which words in the database qualify as potentially matching candidates that must be evaluated by the pattern matching component. In another aspect, the number of candidate words is further limited by determining the total number of inflection points identified that are of any of the types PEN_DOWN, PEN_UP, or ANGLE_THRESHOLD. This total number of inflection points corresponds to the minimum number of letters that a candidate word must contain (since a ROW_CHANGE inflection point is not required to match a letter). Since the input path can pass through or near a letter of the word without creating an inflection point, a candidate word may also contain more than this minimum number of letters.

Another characteristic that is used to limit the number of words of the database that need to be evaluated is the expected minimum number of inflection points in the input pattern. As noted above, words with the same expected input pattern path length may differ greatly in the number of letters in the words. The number of letters and the sequential geometric relationship between them on the keyboard is used to determine the minimum number of inflection points required. In another aspect, for each word in the database, the pattern of directed line segments connecting each successive pair of keys associated with letters in the word is analyzed to determine the number of cases in which the angle between the incoming and outgoing line segments at a key exceeds a predetermined threshold. This number is then recorded with the word as the minimum number of ANGLE_THRESHOLD inflection points that must be present in an input pattern in order for a word to qualify as a potentially matching candidate. The pattern matching component evaluates each determined candidate word in the database by calculating a matching metric that reflects how well the input pattern corresponds to the word. The matching metric is a function of the distances of the letters of the word from a sequence of points along the input pattern, where the points of the input pattern from which distances are calculated must occur in the same sequence as the letters of the word. In one aspect, each inflection point of type PEN_DOWN, PEN_UP, or ANGLE_THRESHOLD must be matched with a letter of the candidate word, such that the distance from the key with which the letter is associated to the inflection point is included in the calculation of the matching metric function. If a ROW_CHANGE inflection point is also identified, and there are one or more unmatched letters between the inflection points on either side of the ROW_CHANGE inflection point, then one of these unmatched letters must be matched with the ROW_CHANGE inflection point, such that the distance from the key with which the letter is associated to the ROW_CHANGE inflection point is included in the calculation of the matching metric function. The distance to any additional unmatched letter is measured from the nearest point along the input pattern that lies between the points from which the distances to the letters immediately preceding and following the unmatched letter were measured, and this distance is also included in the calculation of the matching metric function.

In another aspect, the distance from the input pattern to any potentially matching letter is compared to a maximum threshold distance, such that whenever a letter is found to lie further from any possible matching point in the input pattern than this threshold distance, the word is eliminated as a possible candidate. This serves to speed up the evaluation process, since as soon as the pattern matching algorithm identifies a letter of a word that is outside the threshold distance from any possible matching point on the input pattern, the algorithm immediately proceeds to evaluate the next candidate word.

In one aspect, the matching metric function is calculated as the sum of the distances from the identified inflection points to the keys associated with the letters with which the inflection points are matched, plus the distances to any additional unmatched letters where each is measured from the nearest point along the input pattern as described above. In another aspect, the matching metric function is calculated as the sum of the squares of these distances. In another aspect, prior to calculating the sum, a weighting function is applied to each distance (or squared distance) where the weight applied to each distance is determined according to the type of inflection point from which the distance was measured. In order to normalize the results so that the metric can be used to meaningfully compare results between words with differing numbers of letters, the weighted sum is divided by the sum of the weighting factors used in calculating the sum. In one aspect, the weighting function multiplies each distance by the following factors: 3 for type PEN_DOWN, PEN_UP, or DOUBLE_LETTER; 2 for type ANGLE_THRESHOLD; 1 for type ROW_CHANGE; and 0.5 for distances measured from a point on the input pattern other than an inflection point. The different weighting factors used for the various inflection point types reflect the differing expected levels of confidence that an inflection point of the given type has been accurately located and that in fact the detected inflection point reflects the fact that a letter of the word being input should be located nearby.

In another aspect, depending on the type of inflection point from which a distance is measured, the x- and y-components of the distance are differently weighted. In particular, in the case of a ROW_CHANGE inflection point, it is reasonable to expect that the vertical y-coordinate of the position of the inflection point is a relatively accurate reflection of the vertical position of the intended letter, whereas the x-coordinate position may well differ significantly from that of the intended letter. In this case, the y-component of the distance is weighted more heavily than the x-component of the distance. Significantly reducing the weight applied to the x-component of the distance avoids placing undue weight on the horizontal position of an inflection point when that horizontal position may not be able to be reliably determined.

The problem of identifying the optimal matching between the M letters of a candidate word and the N identified inflection points and input pattern path segments is a variant of the "shortest path" problem which is well known in the field of dynamic programming. Various algorithms, such as the Floyd-Warshall algorithm, have been designed to solve the problem of finding the shortest path that traverses an edge-weighted graph from a designated start vertex to a designated end vertex. This classic problem is analogous in certain ways to the problem of identifying an optimal matching between the inflection points and intervening path segments of an input pattern and the locations of the keys associated with the letters of a potentially matching candidate word. Such algorithms are relatively complex and time-intensive (on the order of $N^3$ for a graph with N vertices). However, the current problem is rendered much more tractable due to a number of important additional constraints:

1. The first and final letters of a candidate word must be matched with the PEN_DOWN and PEN_UP inflection points, respectively, and the sequence of the letters in the spelling of the word must be matched in the sequence in which inflection points occur.
2. Each inflection point must be matched with a letter.
3. The number of letters that can potentially match a given inflection point or path segment is restricted to letters that occur within MAX_DISTANCE of the point or segment, greatly restricting the number of possible solutions to be evaluated.
4. Once the inflection points have been matched with letters, each remaining unmatched letter must be matched with the path segment connecting the inflection points matched with the closest preceding and following matched letters.

The fact that the nature of the input method generally results in input patterns of N inflection points for words of M letters, where M is generally not greatly larger than N, combined with the above constraints, makes it possible to design a matching algorithm based on certain heuristics that exhibits a minimal amount of recursion in operation and consequently runs effectively even on devices with limited processing power. Foremost among these is the fact that, for the (N-2) inflection points that must be matched with letters, there are at most (M-N) letters that even need to be considered.

In one aspect, the pattern matching component uses the following algorithm to match the letters of a candidate word of M letters with the N inflection points determined for an input pattern. The first (PEN_DOWN) inflection point is always matched with the first letter of the word, and the last (PEN_UP) inflection point is always matched with the last letter. The variable Match_Lim is initialized to (M-N), and tracks how many of the letters following the next unmatched letter need to be considered as possible matching candidates for each successive inflection point as the algorithm proceeds. The arrays MATCH[], RECURSE[], and BACK_TRACK[][], and the variable RECURSION_LEVEL, are all initialized to zero, and track where the system may need to back-track when multiple possible solutions are found. For each subsequent inflection point, the system determines how many of the following Match_Lim yet-unmatched letters can be matched with it. If there are none, and RECURSION_LEVEL is set to zero, then the current word is not a candidate and the algorithm returns a failure code. If there is only one, it is matched with the inflection point, and the system determines whether all preceding yet-unmatched letters can be matched with the preceding path segment. If any preceding yet-unmatched letters cannot be matched with the preceding path segment, and RECURSION_LEVEL is set to zero, then the current word is not a candidate and the algorithm returns a failure code. Otherwise, each preceding yet-unmatched letter is matched with the preceding path segment, and Match_Lim is decremented by the number of such letters. For each inflection point matched, the corresponding entry of MATCH[] is set to the index of the letter with which it was matched. If an inflection point J can be matched with more than one of the following Match_Lim yet-unmatched letters, and in each case all of any preceding yet-unmatched letters can be matched with the preceding path segment, then the best-matching letter is provisionally matched with the inflection point, BACK_TRACK[J][0] is set to one less than the number of such letters K, the remaining potential matching letters are stored in BACK_TRACK[J][1. K.] in increasing order of best-match, RECURSE[RECURSION_LEVEL] is set to J, RECURSION_LEVEL is incremented, and the algorithm proceeds to try to match the following inflection point. If the system determines that there are no possible letter matches for a subsequent inflection point, and RECURSION_LEVEL is not set to zero, then the system provisionally goes back to match inflection point J=RECURSE[RECURSION_LEVEL-1] with the letter saved in BACK_TRACK[J][BACK_TRACK[J][0]]. The system decrements BACK_TRACK[J][0], and if BACK_TRACK[J][0] is decremented to 0, RECURSION_LEVEL is also decremented. If the system determines a possible match for each inflection point, the algorithm terminates even if RECURSION_LEVEL is greater than zero. Since the algorithm first chooses the best match for each inflection point with multiple possible matches, the first valid matching identified is likely to be an optimal matching, and in any case, the constraints placed on matching make it unlikely that multiple solutions, if they even existed, would have a significantly different matching metric value. FIG. 3D shows a flowchart for this preferred matching algorithm, which is described in detail in the Description of the Preferred Embodiment.

In another aspect, the pattern matching component uses an alternate algorithm, which does not perform any recursive processing to match the letters of a candidate word with the inflection points determined for an input pattern. The first letter of the word is always matched with the first (PEN_DOWN) inflection point, and the last letter is always matched with the last (PEN_UP) inflection point. For each subsequent letter, the system determines whether it can be matched with the current (next unmatched) inflection point. If it cannot, or alternatively, if the following letter is in fact a better match with (i.e. is closer to) the current inflection point, then determine whether the current letter can be matched with the current path segment at a point that lies between the previous (already matched) inflection point (or the point at which the preceding letter was matched if it was also matched with the current path segment) and the next unmatched inflection point. If not, then the current word is not a candidate, but if so, match the current letter with the current path segment at the determined point and advance to the next letter to determine whether it can be matched with the still-unmatched inflection point. If however, the current letter can be matched with the current (next unmatched) inflection point, then determine whether the following letter can be matched with either the following inflection point or path segment, and if so, match the current letter with the current inflection point and advance to the next letter and the next inflection point, but if not, determine whether the current letter can be matched with the current path segment at a point that lies between the previous (already matched) inflection point (or the point at which the preceding letter was matched if it was also matched with the current path segment) and if so, match the current letter with the current segment and advance to the next letter to determine whether it can be matched with the still-unmatched inflection point.

In another aspect, words in the database also include an indication of the frequency of use associated with the word. The frequency of use associated with a word is then combined with the weighted sum of distances in calculating the matching metric whose value is used to determine the relative ranking of potentially matching candidate words. In one aspect, the matching metric is computed as:

$$(\text{Weighted\_Sum\_of\_Distances}) * (\log(\text{MAX\_FREQ}/\text{Word\_Frequency})+1)$$

where Weighted_Sum_of_Distances is the value calculated by the pattern matching component for the candidate word, Word_Frequency is the frequency of use associated with the candidate word, and MAX_FREQ is the maximum value for frequency of use among words in the database. In this formulation, the smaller the value of the matching metric, the more likely the candidate word is considered to be the intended match for the input pattern.

In another aspect, one or more of the words identified as the most likely candidates by the pattern matching component are offered to the user for selection by a word selection component. In one aspect, a predetermined number of the most likely candidates, for example, four, are displayed in a word choice list from which the user can select the intended word for insertion into the text being composed. In another aspect, if the user makes no explicit selection of a candidate word from the word choice list, when a subsequent input action is taken (for example, the user begins to trace out a next input pattern or an explicit character is selected for output), the default word choice (the word deemed to be the most likely candidate) is automatically accepted for insertion into the text being composed. In another aspect, when no action is taken by the user for a threshold period of time following the display of a word choice list, the default word choice is automatically accepted for insertion into the text being composed.

In another aspect, when a word is to be output for insertion into the text being composed immediately following a preceding output word, a single space is automatically inserted into the output text before outputting the word. This significantly speeds up prose text entry since the user no longer has to explicitly activate a space key between each output word, and can enter one word after another as a succession of input patterns, with the proper spacing between words being automatically generated. Since a space is not automatically output following every word, when the user wishes to enter punctuation such as a comma or period, there is no need to delete an automatically output space before entering the punctuation.

In another aspect, the system records the length of time that the stylus is in contact with the touch-screen while tracing out the input pattern. This enables the system to estimate the average speed with which the stylus was moved by the user in tracing out the input pattern. Since it is reasonable to assume that, with practice or familiarity, the user will become faster at tracing out the input pattern for a word, the system can use apply a higher weighting to the influence of word frequency in calculating matching metric values for words in the database, since words that are more commonly used will tend to be entered more quickly that words which are less familiar to the user.

In another aspect, additional time information is recorded with the input pattern, such as time stamping the sequence of recorded contact locations at fixed intervals (e.g. every 10 msec.) so that the speed with which the stylus was moved along the input pattern at each point can be estimated.

There will be occasions when the user recognizes that he or she has made an error in inputting the current word, such as forgetting a letter, realizing that the stylus has been moved to an unintended location, or some other similar error. Since the system will always attempt to find the best match and identify at least one default word choice, the user would then have to lift the stylus from the touch-screen, move to a key that cancels the current word choice list, and activate that key. In another aspect, the input pattern analysis component recognizes a "Cancel" gesture that can be made at any point in tracing out an input pattern. In one aspect, the gesture includes simply moving the stylus rapidly back and forth a threshold number of times, where the stylus is moved faster than a threshold speed. In one aspect, the default number of movements is three (for example, right-left-right), and the minimum threshold speed of movement is automatically set in reference to the fastest stylus movement speed measured during input of a word that was accepted by the user (for example, 5% faster than this fastest speed). Since the "Cancel" gesture does not need to be controlled or executed with any precision, it is easy to perform at a high speed). The Cancel gesture described in the present invention is simple and intuitive because it conveys the feeling of simply "scribbling out" the previously drawn input pattern. In another aspect, the system provides visual and/or auditory feedback (for example, a distinctive beep) as soon as the input pattern analysis component recognizes the Cancel gesture. The user can then simply lift the pen from the touch-screen and start over again entering the intended word. This feature is also useful when the user simply decides mid-way through entering a word that a different word is more appropriate.

As described above, the pattern matching component compares the position of the inflection points extracted by the input pattern analysis component to the idealized locations of inflection points for words in the database (corresponding to the center of the key for each associated letter) to rank potential word matches. In another aspect, this algorithm is further enhanced to account for patterns that are detected for a given user (e.g. a tendency to consistently overshoot target letters by a certain percentage), by adjusting the locations of the inflection points extracted from the input pattern according to these detected habitual patterns of input. Each time the user selects a word for output from the word selection component, the location of each inflection point is compared to the location of the center of the key associated with the letter in the output word with which the inflection point was associated. In another aspect, the x-coordinate difference and the y-coordinate difference between the two locations are computed. A running average of these differences is calculated for each type of inflection point (PEN_DOWN, PEN_UP, ANGLE_THRESHOLD, ROW_CHANGE, TAP and DOUBLE_LETTER). For PEN_DOWN and PEN_UP inflection points, separate running averages are calculated based on whether the vector of the path of the input pattern (originating from the PEN_DOWN, or terminating at the PEN_UP location) is in a positive or negative direction. For ANGLE_THRESHOLD inflection points, separate running averages are calculated based on whether the corresponding second difference is positive or negative. Then, as each new input pattern is entered, the x- and y-coordinates of each inflection point extracted by the input pattern analysis component are adjusted by adding the average difference calculated for the type of inflection point (or a predetermined fraction thereof). The adjusted inflection point positions are then used by the pattern matching component to identify the intended word. This method enables the system to identify any consistent trends in user input patterns. For example, if the user consistently overshoots the intended letter only when moving to the right to reach a key on the right side of the keyboard, and undershoots the intended letter only when moving to the left to reach a key on the left side of the keyboard, this pattern will be detected because the running averages are computed separately for ANGLE_THRESHOLD inflection points occurring at the end of a stylus movement to the right (resulting in a negative second difference in the x-coordinate) and for those occurring at the end of a stylus movement to the left (resulting in a positive second difference in the x-coordinate). When there is no consistent relationship between an inflection point type and the intended key location, the running average for that inflection point type will approach zero, and the adjustment will have a negligible effect.

In another aspect, a single tap on the keyboard is recognized by the input pattern analysis component as an inflection point of type TAP. The pattern matching component processes an inflection point of type TAP by first determining whether there are one or more one-letter words within a threshold distance from the inflection point, and if so, a word choice list is generated comprising the one or more one-letter words, with the one-letter having the best matching metric score displayed as the default word choice. In addition, the letter associated with the key within whose boundaries the location of the tap contact occurred (the "tap location letter") is also added to the word choice list following any one-letter words (unless this letter is already displayed as a one-letter word). If the user proceeds to trace out an input pattern following the TAP contact, then the default word choice (generally a one-letter word, but possibly the tap location letter if no one-letter word was determined to be a candidate) is inserted into the output text as a one-letter word, just the same as a multi-letter default word choice. If however, the user proceeds to continue tapping the keyboard, then the sequence of taps generates a word object comprised of the tap location letters concatenated in the sequence that the corresponding keys are tapped (the "tap location word"). Following the second tap, this word composed of the tap location letters appears as the default word choice in the word choice list. Selection of this word by the user (either by explicitly selecting it from the word choice list or by proceeding to trace out an input pattern to input a next word, thus selecting the tapped word by virtue of its being the default word choice) inserts the word into the output text. In another aspect, whenever such a word composed of tap location letters is accepted for output into the text being generated, if the word is not already present in the database it is automatically added to a user word list of words added by this user to the database of words initially present in the system.

In many languages, a variety of alternate forms of certain letters are commonly used, generally consisting of letters with various diacritic marks. For example, depending on the language, other forms of the letter "e" that are commonly used include the letters "è," "é," "ê," and "ë" (other forms are also possible—this is simply an illustrative example). Most on-screen keyboards require the user to select a special alternate mode to display one or more alternate keyboards from which the desired alternate letter form must be selected. In the present invention, such alternate letter forms are handled in two distinct and advantageous ways. First, each alternate form of a letter that is used in the language (or languages) of the words in the database is associated with the same key with which the base form of the letter is associated ("e" in the current example). Since the information specifying which alternate forms of letters are used in the spelling of words is included in the database, the user is able to enter such words with alternate letter forms just as words without alternate letter forms are entered—that is, simply by tracing out an input pattern that passes through or near the sequence of keys associated with the base forms of all the letters in the word. In a case where two words are present in the database corresponding to exactly the same sequence of keys (i.e. words that are identical except for the occurrence of one or more alternate letter forms), these words will generally both be added to the word choice list, with the word having a higher frequency of use appearing higher in the word choice list.

The second manner in which alternate letter forms are handled in an advantageous way is in the entry of new words composed of a sequence of tap location letters. In the present invention, the user does not need to select an alternate keyboard in order to explicitly select an alternate letter form to spell out a new word that is not present in the database. In another aspect, alternate letter forms can be selected by contacting the key with which the base form of the letter is associated and maintaining contact with the key (without sliding off of it) for a period of time exceeding a predetermined threshold length of time. Once the threshold time period is exceeded, a "pop-up list" of the alternate letter forms associated with the key is displayed, at which time the user can slide the point of contact to the desired alternate form of the letter in the list, lifting the stylus to select the alternate form as the tap location letter. This alternate letter form is then added as usual to the tap location word, enabling the user to easily create any desired sequence of letters in spelling a new word, including alternate letter forms, without having to change the mode of the keyboard.

In another aspect of the invention, the keyboard layout is modified to enhance the system's ability to distinguish between input patterns that might otherwise be more difficult to distinguish. Due to its familiarity to the vast majority of users, the standard "QWERTY" keyboard arrangement is preferred by most users. A disadvantage of this layout is the proximity of the vowels "u," "i," and "o." Since the system is designed to allow the user to be imprecise in tracing out an input pattern, and since these vowels are often interchangeable in otherwise identical words (e.g. "hut," "hit," and "hot"), the proximity of these vowels in the standard "QWERTY" arrangement gives rise to a significant proportion of the incidence of failure to offer the user's intended word as the default choice. In another aspect, the width of the "i" key is increased, effectively increasing the separation between the centers of the three adjacent vowel keys, and as a result making it easier for the user to quickly position the stylus relatively nearer to the intended letter of the three. Since confusion between the "u" and the "o" and other adjacent letters is not an issue, it is not necessary to also expand the width of these keys. Similarly, the adjacent nasal consonants "n" and "m" are often interchangeable, and in another aspect, the width of the keys associated with "n" and "μm" are slightly increased to increase the separation between the centers of these keys.

In another aspect, the keyboard layout is further modified to enhance the system's ability to correctly analyze input patterns by stretching the keyboard in the vertical direction. By increasing the distance between adjacent rows of the keyboard, the user is more easily able to quickly trace out an input pattern that correctly positions both line segments and inflection points within the actual row of the keyboard that contains the key of the intended letter. This improves the performance of the pattern matching component since it greatly reduces confusion between candidate words that differ only in letters that are in adjacent rows (e.g. "hot" and "not"). The matching metric computation by the pattern matching component can then be modified to apply increased weight to the vertical component of the distance between the key of a letter of a candidate word and the location of an inflection point.

When the system presents the user's intended word as the default word choice, no additional action is required from the user, since proceeding to trace the input pattern for the next desired word causes the default word choice to be automatically output for insertion into the text being composed. When the system correctly identifies the user's intended word with a high degree of accuracy, there may be a tendency to pay less attention to the word choice list in order to move quickly from one word to the next, speeding up the entry of text. As a result, there may occasionally be instances where the default choice does not correspond to the user's intended word, so that an unintended word is entered into the output text which must be subsequently edited by the user to change it to the intended word. In another aspect, the system allows the user to select a word in the output text for re-editing, for example by double-tapping the word to be edited or by highlighting the word and activating a designated editing function key. When a word is selected for re-editing, the system creates a simulated input pattern by creating a path that connects in sequence the centers of the keys associated with the sequence of letters that comprises the word. In order to avoid creating "artificial" inflection points where they were unlikely to exist in the original input pattern, a smoothing process is first applied to the created input pattern to avoid the creation of ANGLE_THRESHOLD inflection points at keys where in fact the path of the input pattern changes direction only slightly. The smoothed input pattern is then processed by the system in the same manner as an input pattern traced out by the user. In another aspect, a longer word choice list is created to increase the probability that the user's originally intended word appears somewhere in the word choice list. Since the word being re-edited was close enough to the original input pattern to be selected as the default word choice, there is a strong likelihood that the originally intended word will be close enough to the created input pattern that it will appear in the word choice list created by the pattern matching component in processing the created input pattern. Selecting a word from the word choice list automatically replaces the word highlighted for re-editing with the selected word.

Although the description above contains many specifications, these should not be construed as limiting the scope of the invention but as merely providing illustrations of some of the present aspects of this method. For example, the input pattern can be analyzed with other methods, the database of words can be organized in other ways, and the pattern matching component can use other algorithms to identify the most likely candidate words. For example, on a device with sufficient processing power, the sequence of letters forming each word in the database could simply be compared to the input pattern, measuring in sequence the distance of each letter of a word from the nearest point on the input pattern that occurs later than the point from which the preceding distance measurement was taken. The fundamental insight of the invention is that text input using a touch-screen keyboard can be performed much more rapidly and efficiently by the user when it is possible to use a familiar and constant keyboard arrangement, but without having to lift the stylus from the touch-screen between entering each letter, and without having to pause or perform any other action than trace out a path that passes through or near each letter in sequence. Any type of touch-screen may be used by the system, and the input device may be a stylus, a finger, or any tool that works as an input device on the touch-sensitive screen. The touch-sensitive screen may be utilized by any type of computer or hand-held computer capable of performing the required processing. Thus the scope of the method should be determined by the appended claims and their legal equivalents, rather than by the specific aspects described above.

BRIEF DESCRIPTION OF THE DRAWINGS

The preferred and alternative embodiments of the present invention are described in detail below with reference to the following drawings:

FIGS. 3A through 3J show a preferred embodiment of a software algorithm to implement the method of the present invention in order to determine the most likely word or words in a database that match an input pattern traced out by a user.

DETAILED DESCRIPTION OF THE PREFERRED EMBODIMENT

Figure 1:
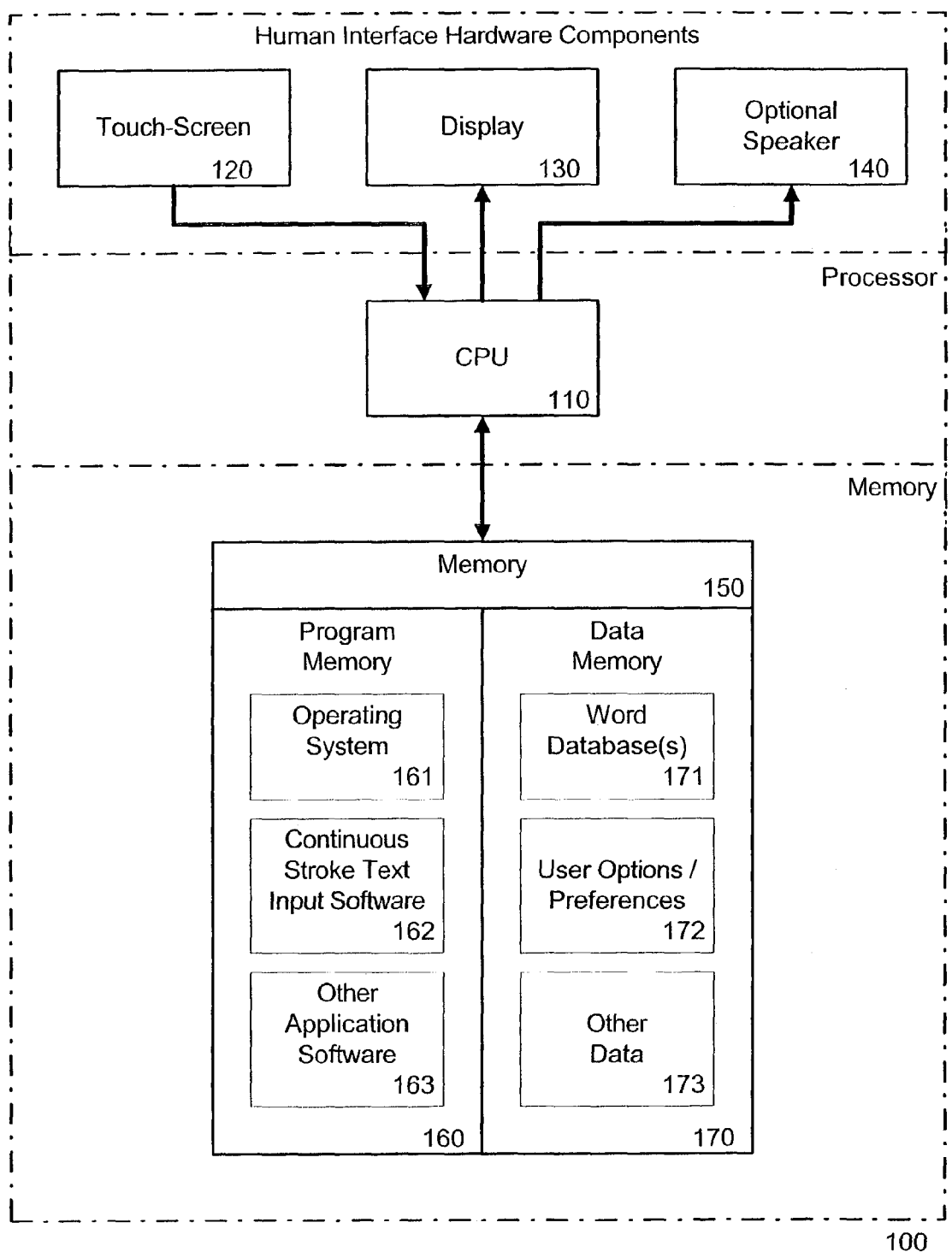
FIG. 1 is a hardware block diagram showing the typical hardware components of a system which embodies the method of the present invention as shown in FIGS. 2A and 2B.

FIG. 1 shows a simplified block diagram of the hardware components of a typical device 100 in which the System and Method for Continuous Stroke Word-Based Text Input is implemented. The device 100 includes a touch-screen 120 provides input to the CPU (processor) 110 notifying it of contact events when the screen is touched, typically mediated by a hardware controller that interprets the raw signals received from the touch-screen and communicates the information to the CPU 110 using a known communication protocol via an available data port. Similarly, the CPU 110 communicates with a hardware controller for a display 130 to draw on the display 130. Optionally a speaker 140 is also coupled to the processor so that any appropriate auditory signals can be passed on to the user as guidance (predominantly for error signals). The processor 110 has access to a memory 150, which may include a combination of temporary and/or permanent storage, and both read-only and writable memory (random access memory or RAM), read-only memory (ROM), writable non-volatile memory such as FLASH memory, hard drives, floppy disks, and so forth. The memory 150 includes program memory 160 that contains all programs and software such as an operating system 161, a Continuous Stroke Word-Based Text Input software 162, and any other application programs 163. The memory 150 also includes data memory 170 that includes the word database(s) 171 required by the Continuous Stroke Word-Based Text Input software 162, storage for maintaining a record of user options and preferences 172, and any other data 173 required by any element of the device 100.

Figure 2A:
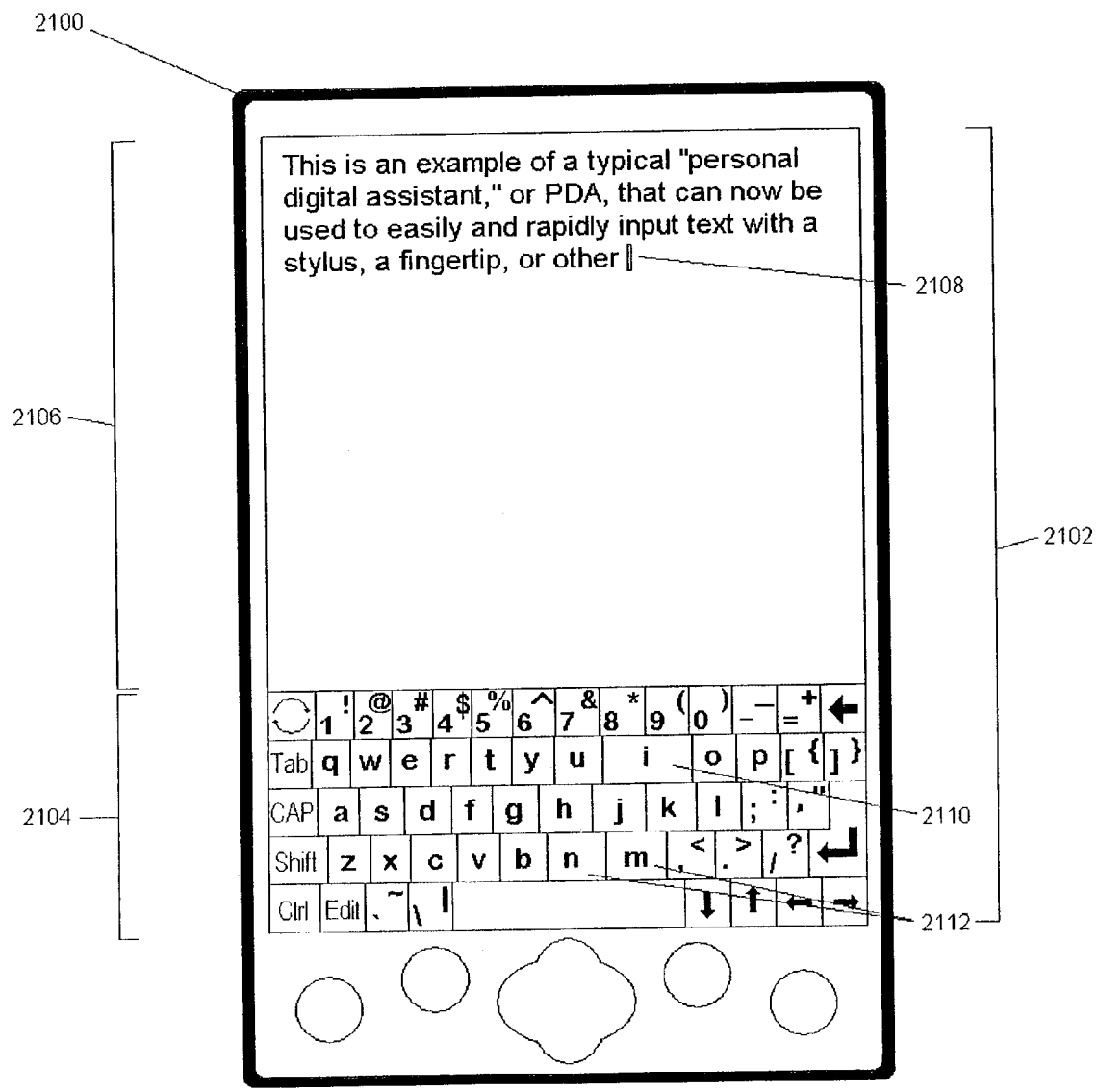
FIG. 2A is a schematic view of a preferred embodiment of a portable computer with a touch-screen display on which a keyboard system of the present invention is displayed.

FIG. 2A shows a schematic view representative of a typical handheld portable computer 2100 (often called a "personal digital assistant" or PDA) that incorporates on its touch-screen 2102 display a keyboard 2104 designed and used in accordance with the present invention. The keyboard 2104, when used in accordance with the present invention, generates text which is output to the text display region 2106 at a text insertion location 2108. The term "keyboard" in this application refers to any keyboard that is implemented on a touch-sensitive surface, including both a keyboard presented on a touch-sensitive display as in FIG. 2A, and also a keyboard imprinted on a touch-sensitive surface. Keyboard 2104 explicitly shows the 26 letters of the English alphabet on 26 individual keys, arranged in approximately the standard "QWERTY" arrangement found on most keyboards. In accordance with one preferred embodiment, certain keys, such as the "i" key 2110 as shown on keyboard 2104 is significantly wider than an average key in order to have greater separation between other adjacent keys, such as the often ambiguous "u," "i," and "o" keys ("ambiguous" in the context of the present invention because there are common instances of sets of words that are identical save for the substitution of one of these vowels for the other). Similarly, and for the same reason, the "n" and "m" keys 2112 are displayed with a slightly greater than average width.

Figure 2B:
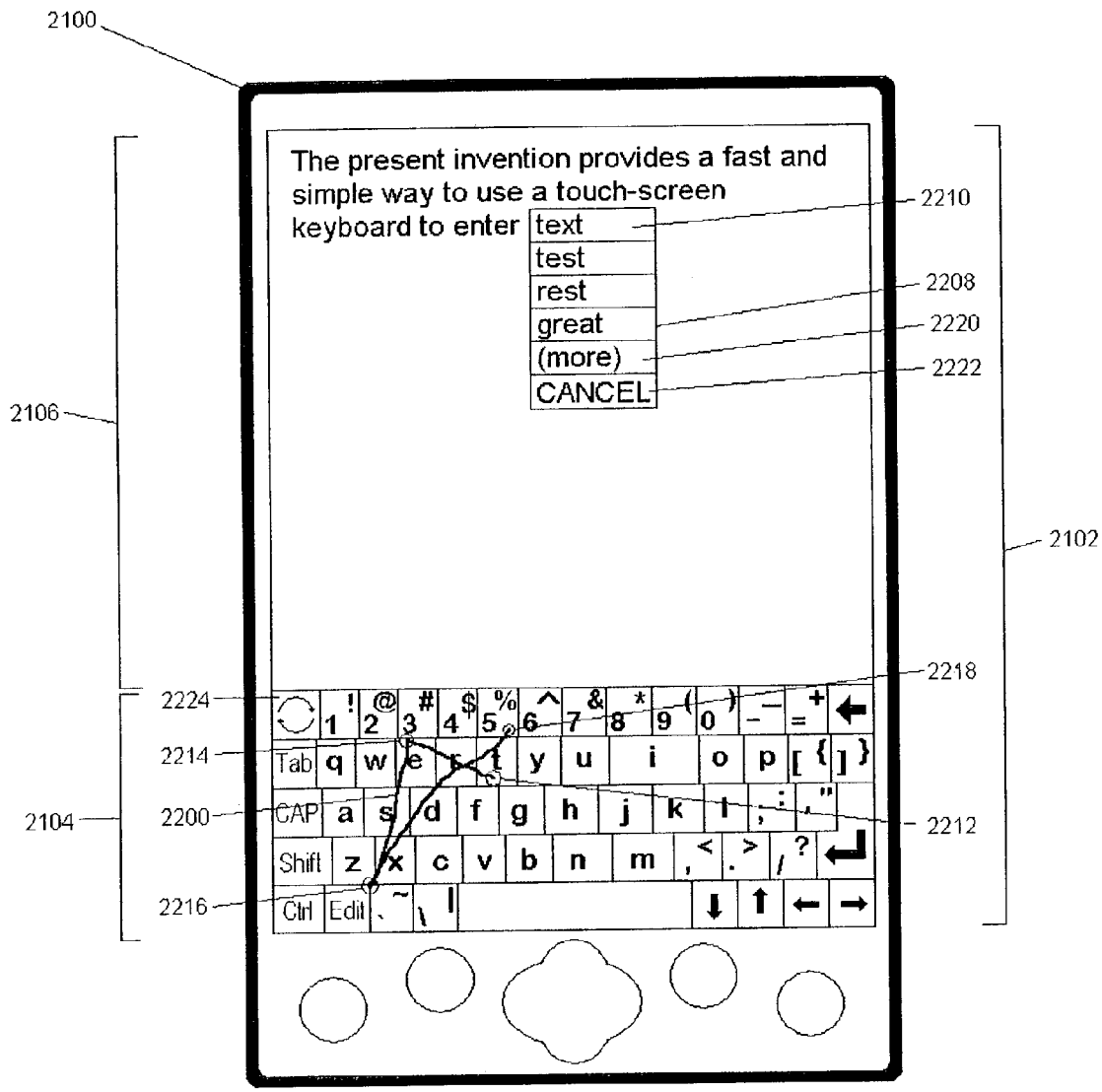
FIG. 2B is the same view showing an embodiment of a word selection list displayed after a user has completed tracing out an input pattern and has lifted the stylus from the touch-screen.

Text is generated by contacting keyboard 2104 at or near the key associated with the first letter of the word being input, and tracing out a continuous pattern that passes through or near each letter of the word in sequence, and breaking contact with the touch-screen when the last letter of the word is reached. FIG. 2B shows the same schematic view of the computer 2100, where the path of a representative input pattern 2200 is shown superimposed on the displayed keyboard 2104. In one preferred embodiment, the user may select as an option whether the path of the input pattern is in fact literally drawn on the display, and erased when a word is selected from a selection list 2208 displayed in the display region 2106 or when the selection list 2208 is canceled. In the example shown in FIG. 2B, this option is turned on for illustrative purposes. In this example, the user has attempted to enter the word "text," and the system has successfully matched the word "text" as the most likely candidate word so that it is displayed in a default word choice location 2210 in selection list 2208. The path of an input pattern, as entered by a user using a touch device, such as a stylus pen, starts at an initial contact point 2212, which location is received by the processor and recorded by an input pattern analysis component that is being executed by the processor as the PEN_DOWN inflection point for the input pattern. The user moves the stylus so that the path then moves first to the key associated with the letter "e," then turns sharply to move toward the key associated with the letter "x," creating an ANGLE_THRESHOLD inflection point that is recognized by the input pattern analysis component at location 2214. Then, in the vicinity of (though not on) the key associated with the letter "x," the path turns sharply back up toward the key associated with the letter "t," creating a second ANGLE_THRESHOLD inflection point that is recognized by the input pattern analysis component at location 2216. Finally, the stylus is lifted from the touch-screen at location 2218, which is recorded by the input pattern analysis component as a PEN_UP inflection point for the input pattern. In another preferred embodiment, the selection list 2208 also shows three additional candidate words having the next three highest matching metric values, which in an example shown in FIG. 2B are the words "test," "rest," and "great." In the preferred embodiment, when a letter of a word lies more or less along a straight path between the preceding and following letters (as in the case of the letter "r" in "great"), there is no need to do anything other than continue the path of the input pattern through or near the intended letter. Thus, in accordance with another preferred embodiment, in the example of FIG. 2B, although only four inflection points were identified by the input pattern analysis component, the processor identifies the word "great" which has more than four letters.

In another preferred embodiment, the selection list 2208 also includes a "(more)" function 2220, the selection of which causes the processor to identify and display the next four additional candidate words having the highest matching metric values of the remaining words in the database. In the example of FIG. 2B, although not shown, the next four such candidates are "fear," "tear," "year" and "feat", and would be displayed in selection list 2208 in response to a selection of the "(more)" function 2220. If for any reason the user chooses not to select any word in the displayed selection list 2208, the selection list display can be closed by selecting a "CANCEL" function 2222.

In yet another preferred embodiment, when the user enters input patterns with sufficient precision and finds that the default is virtually always the intended word, the user can choose to turn off the selection list display such that only the default word is displayed at the insertion point. A Re-Edit function key 2224 that is presented in the keyboard 2104 must be activated before proceeding in order to display a selection list with alternate word choices. Alternatively, in another preferred embodiment, the user can simply choose to reduce the number of word choices displayed in the selection list 2208.

Figure 2C:
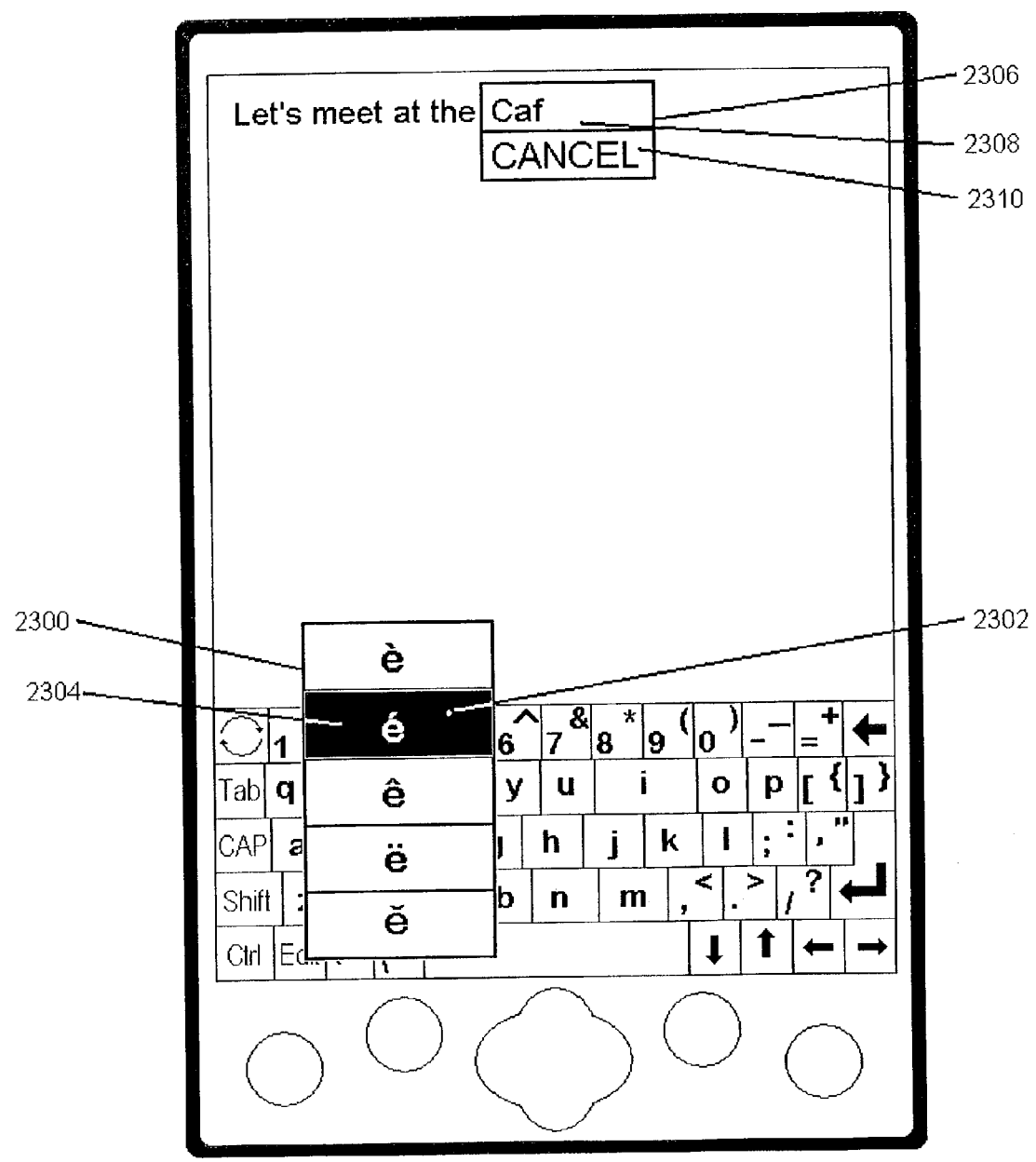
FIG. 2C is the same view showing an embodiment of an alternate letter form pop-up selection list displayed after a user has touched the stylus on the "e" key, and maintained contact with the key past a predetermined time threshold.

In accordance with another preferred embodiment, although not normally displayed explicitly on the keys of keyboard 2104, various alternate letter forms, such as letters with diacritic markings, are associated with each key that is associated with and displays the base form of the letter with alternate forms. In accordance with another preferred embodiment, FIG. 2C shows a "pop-up" menu 2300 of alternate letter forms of the letter "e" that is displayed after a user has touched the stylus on the "e" key, and maintained contact with the key past a predetermined time threshold. In the example shown in FIG. 2C, the user has slid the stylus' point of contact 2302 up to the list row 2304 containing the alternate letter form "é," which is correspondingly highlighted, so that when the user lifts the stylus from the screen, the letter "é" will be explicitly added to the word currently being spelled through conventional "tapping." This embodiment enables a user to explicitly enter alternate forms of letters to spell out words that are not yet present in the system's database, without having to switch to an alternate keyboard layout display. In the example shown in FIG. 2C, the user is in the process of spelling out the word "Café," and has already "tapped" the Shift key, followed by the "c," "a" and "f" keys, creating the TAP location word object "Caf" which appears in a word selection list 2306 at the text insertion point as a default (and only) word object in the list. When the user lifts the stylus from the screen at position 2302, the letter "é," will be appended to the TAP location word to form the word "Café," which, in accordance with another preferred embodiment, can be explicitly selected by tapping the selection list 2306 at row 2308, or implicitly selected by proceeding to enter a continuous stroke input pattern for a next word. Alternatively, the user can cancel the current selection list by selecting the row 2310 associated with the CANCEL function.

Figure 2D:
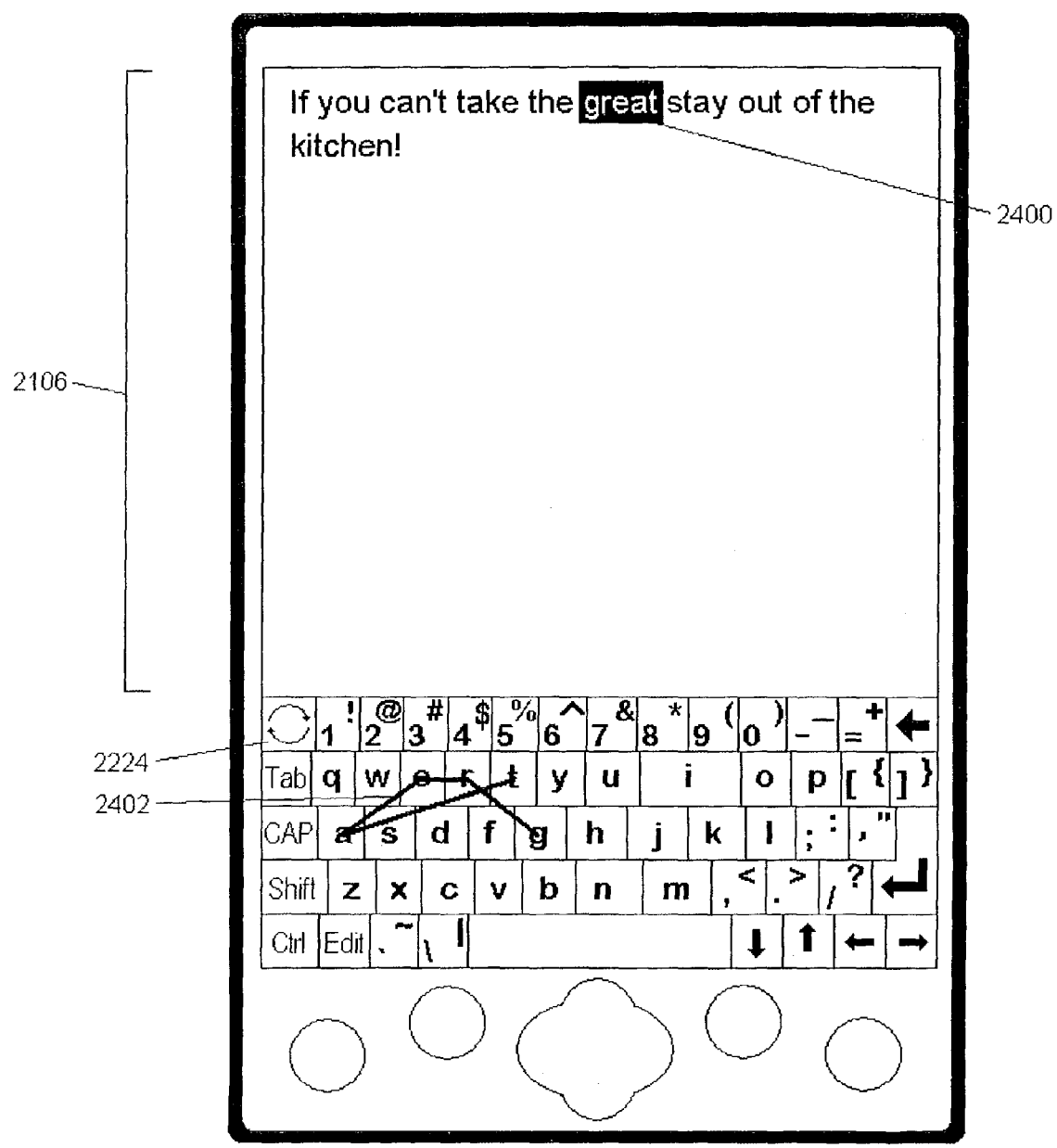
FIG. 2D is the same view showing the first stage in an embodiment of the "Re-Edit" function that assists the user in correcting a previously output word when the user failed to select the intended word from the word selection list.
Figure 2E:
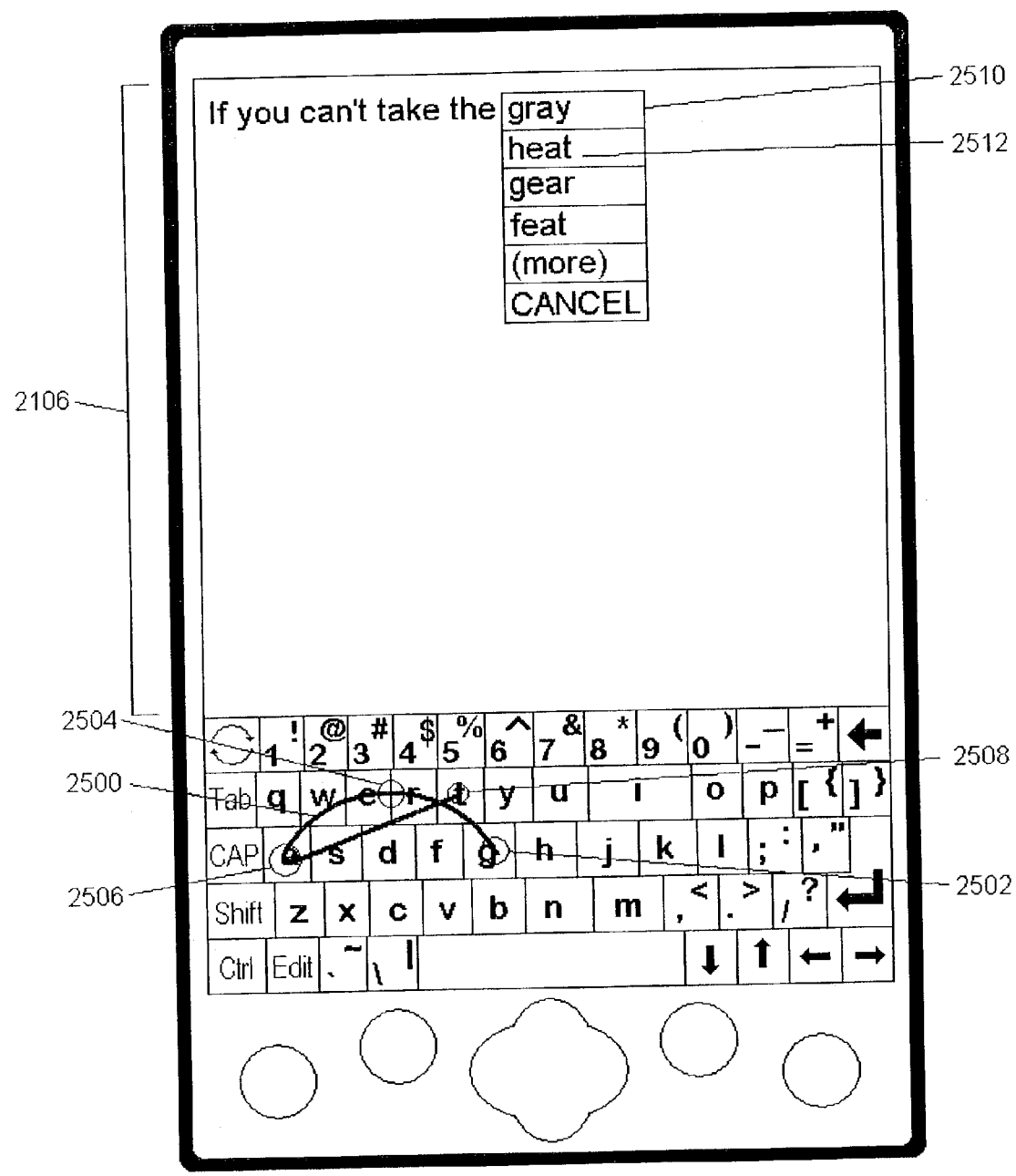
FIG. 2E shows the same view, illustrating the second stage in the operation of the "Re-Edit" function.

In another preferred embodiment, as shown in FIG. 2D, the Re-Edit function activated by the Re-Edit function key 2224 can be used to correct a previously output word when the user has unknowingly accepted the default word for output to the text area 2106 in an instance where the default word did not correspond to the intended word. The unintended output word is selected, either by double-tapping the word to highlight it or by using any of a number of well-known techniques. Once the target word ("great" 2400 in FIG. 2D) is selected, the user activates the Re-Edit function key 2224 by tapping it. The processor then creates a simulated input pattern 2402 by creating a path that connects in sequence the centers of the keys associated with the sequence of letters that comprises the target word. FIG. 2D shows the simulated input pattern 2402 created by the processor for the target word "great" 2400. In order to avoid creating "artificial" inflection points where they were unlikely to have existed in the original input pattern, a smoothing process is first applied to the created input pattern 2402 to avoid the creation of spurious ANGLE_THRESHOLD inflection points at keys where in fact the path of the input pattern changes direction only slightly. FIG. 2E shows a smoothed input pattern 2500 created by applying a smoothing process to the initial simulated input pattern 2402 of FIG. 2D. The smoothed input pattern 2500 is then processed by the system in the same manner as an input pattern traced out by the user, resulting in the identification of a PEN_DOWN inflection point at location 2502; a ROW_CHANGE inflection point at location 2504; an ANGLE_THRESHOLD inflection point at location 2506; and a PEN_UP inflection point at location 2508. A pattern matching component executed by the processor then processes the smoothed input pattern 2500, resulting in the creation of the selection list 2510 shown in FIG. 2E. In this example, the originally intended word "heat" appears as the second word 2512 in the selection list 2510. Selecting the word in the selection list 2510 automatically replaces the highlighted target word "great" with the originally intended word "heat" in the output text area 2106.

Figure 2F:
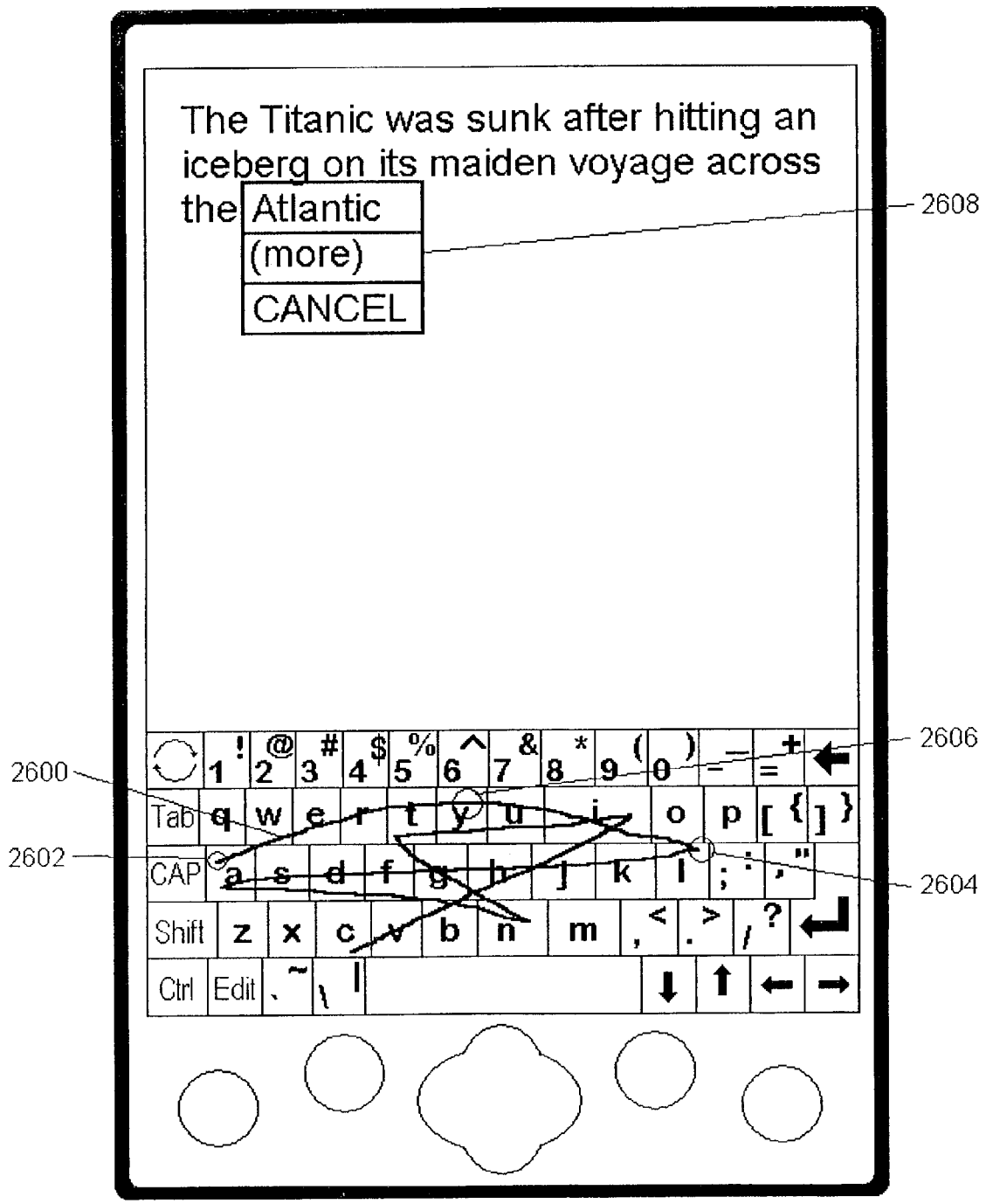
FIG. 2F is the same view again, showing an example of a ROW_CHANGE inflection point identified in an input pattern corresponding to the word "Atlantic"

FIG. 2F illustrates an example of a ROW_CHANGE inflection point. The figure shows an input pattern 2600 traced on the keyboard in order to enter the word "Atlantic." Given the relatively large distance between the "a" key and the "l" key, and the relatively small deflection required to move upward on the keyboard to pass through the "t" key in moving from the "a" to the "l" key, it is not surprising that there is no rapid change in direction near the "t" key that can be recognized as an ANGLE_THRESHOLD inflection point. In one preferred embodiment, as each new inflection point is identified by the input pattern analysis component, the segment connecting the preceding inflection point to the newly identified inflection point is re-examined. When the input pattern analysis component determines that both the current and the preceding inflection point are located in the same row (in the example of FIG. 2F, inflection points 2602 and 2604 in the row containing the "a" and "l" keys), and that the intervening input path deviates from that row to pass through a higher or lower adjacent row of keys (the row containing the "t" in the current example), then a ROW_CHANGE inflection point is identified at the point of furthest deviation from the row containing the surrounding inflection points. In FIG. 2F, a ROW_CHANGE inflection point is identified by the input pattern analysis component at location 2606. The resulting set of inflection points determined for the input pattern of FIG. 2F are a very close match for the intended target word "Atlantic." In another preferred embodiment, as illustrated in the selection list 2608 of FIG.

2F, when the difference between the matching metric computed for one candidate word and the matching metric computed for the next-best matching candidate word exceeds a predetermined threshold, the display of potentially matching candidates in the selection list is truncated to exclude the next-best matching candidate word and all other words with lower matching metric scores. This tends to minimize the size of the displayed selection list by excluding words that are unlikely to be the intended word so that the limited text output area is generally less obscured by the selection list. Any candidate words truncated from the display are displayed as usual in response to an activation of the "(more)" function.

Figure 3A:
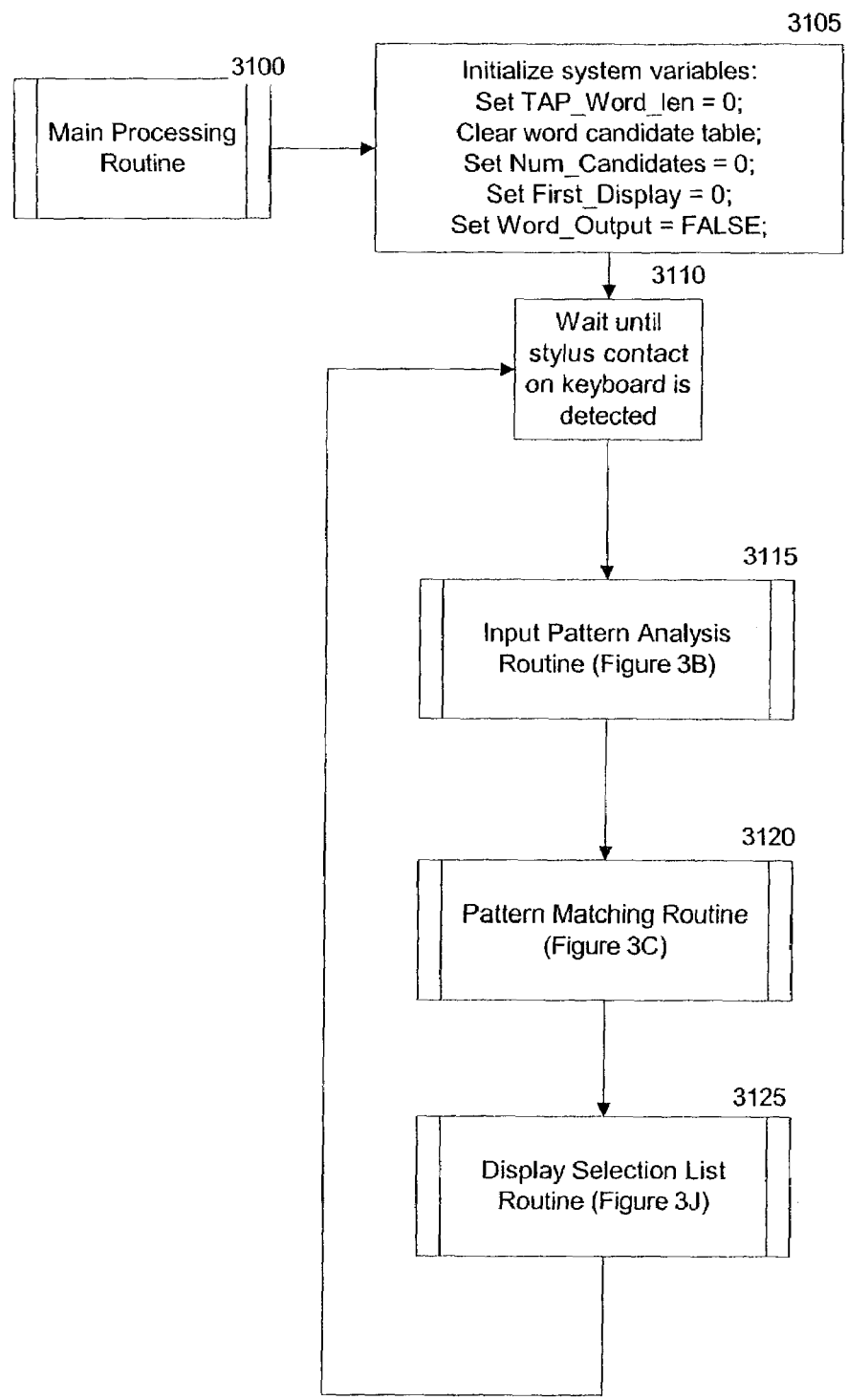
Figure 3B:
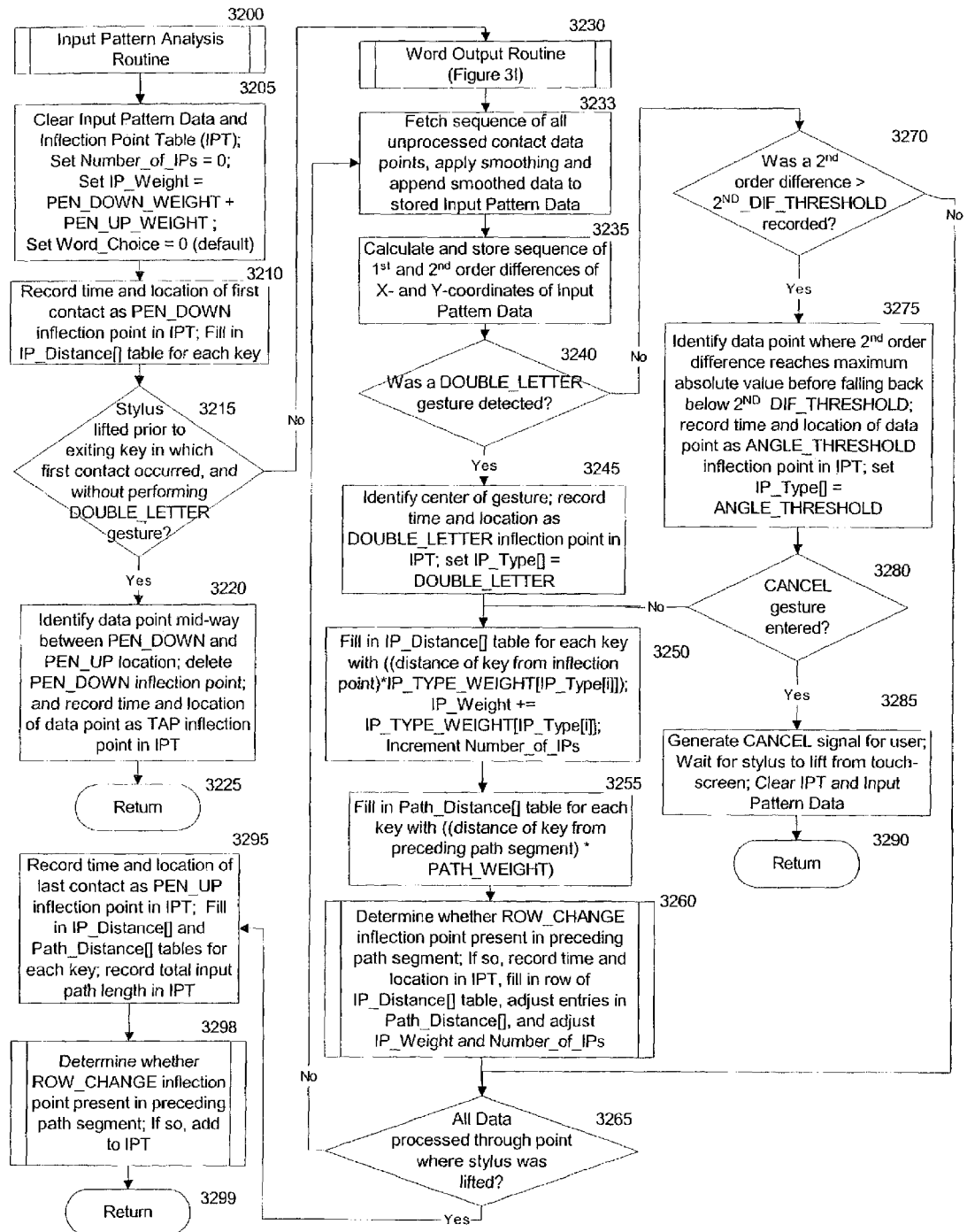
Figure 3C:
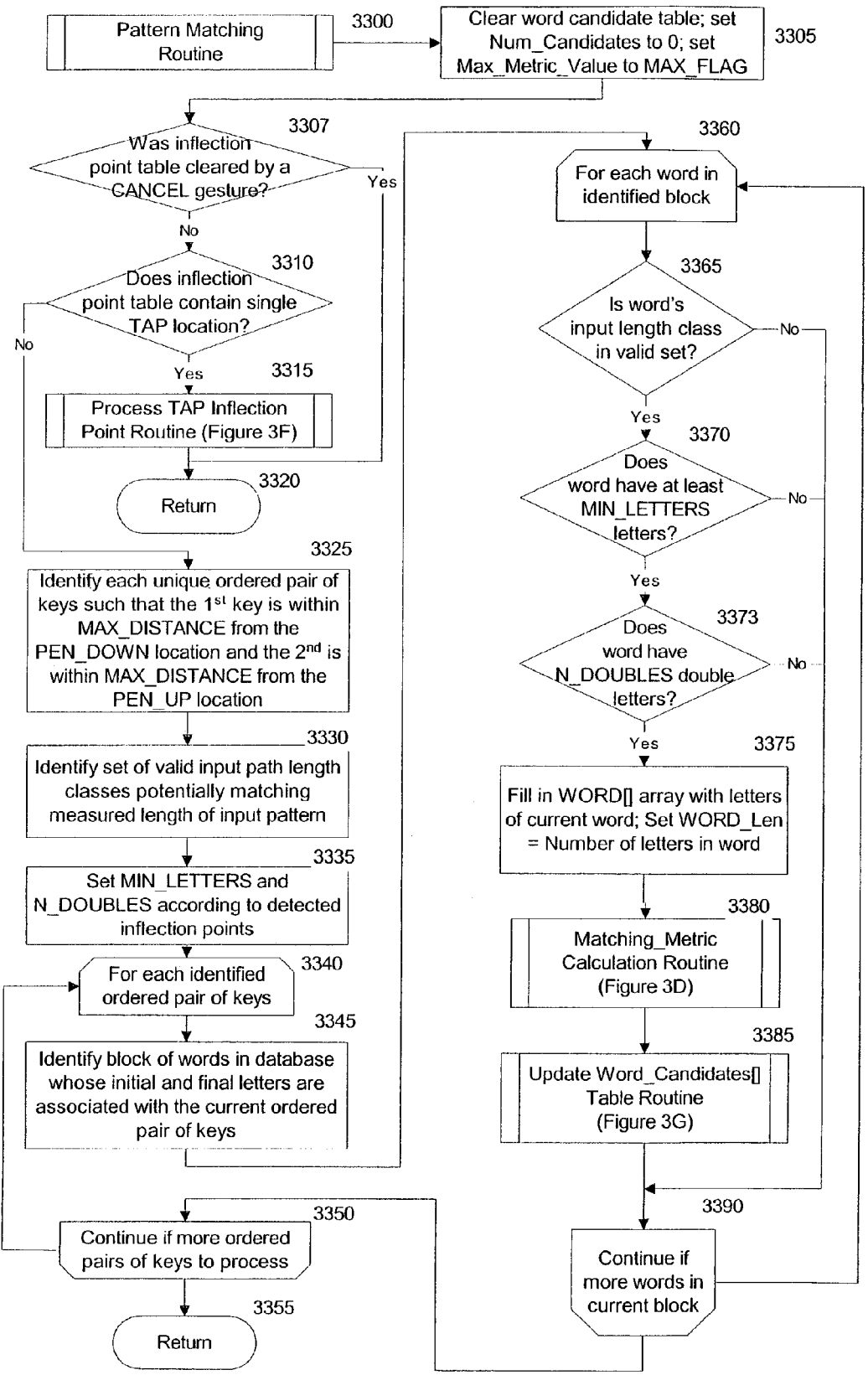
Figure 3E:
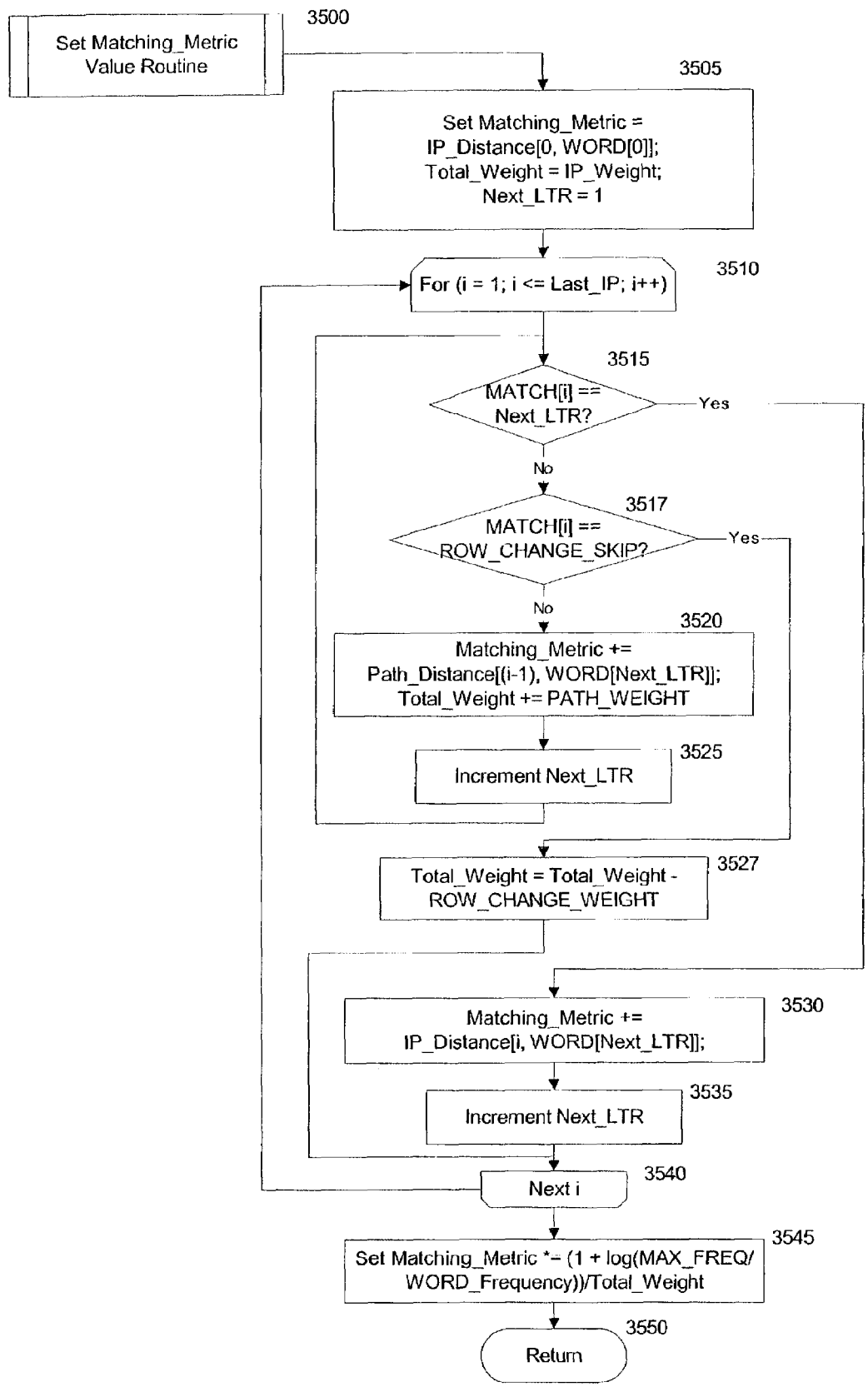
Figure 3F:
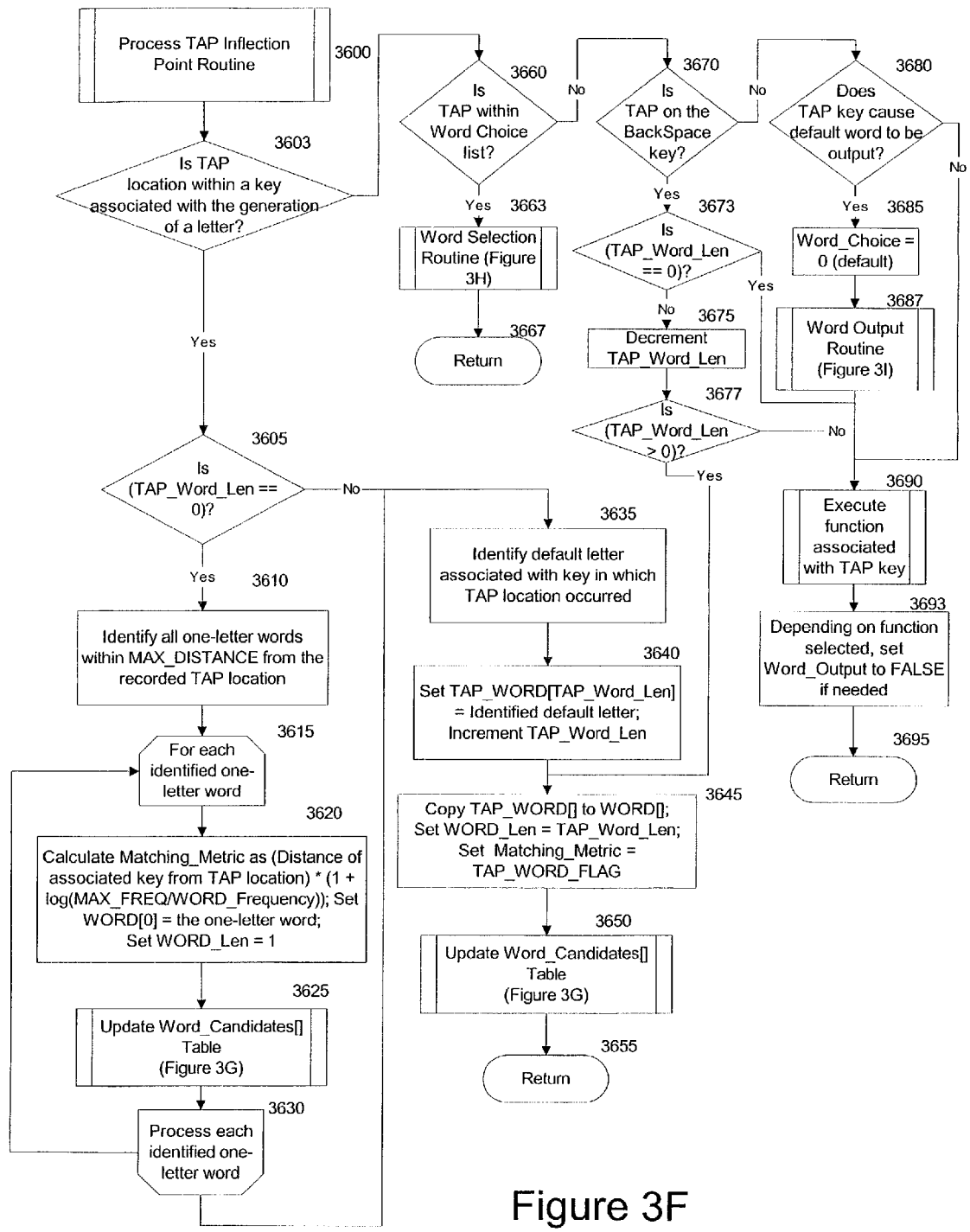
Figure 3G:
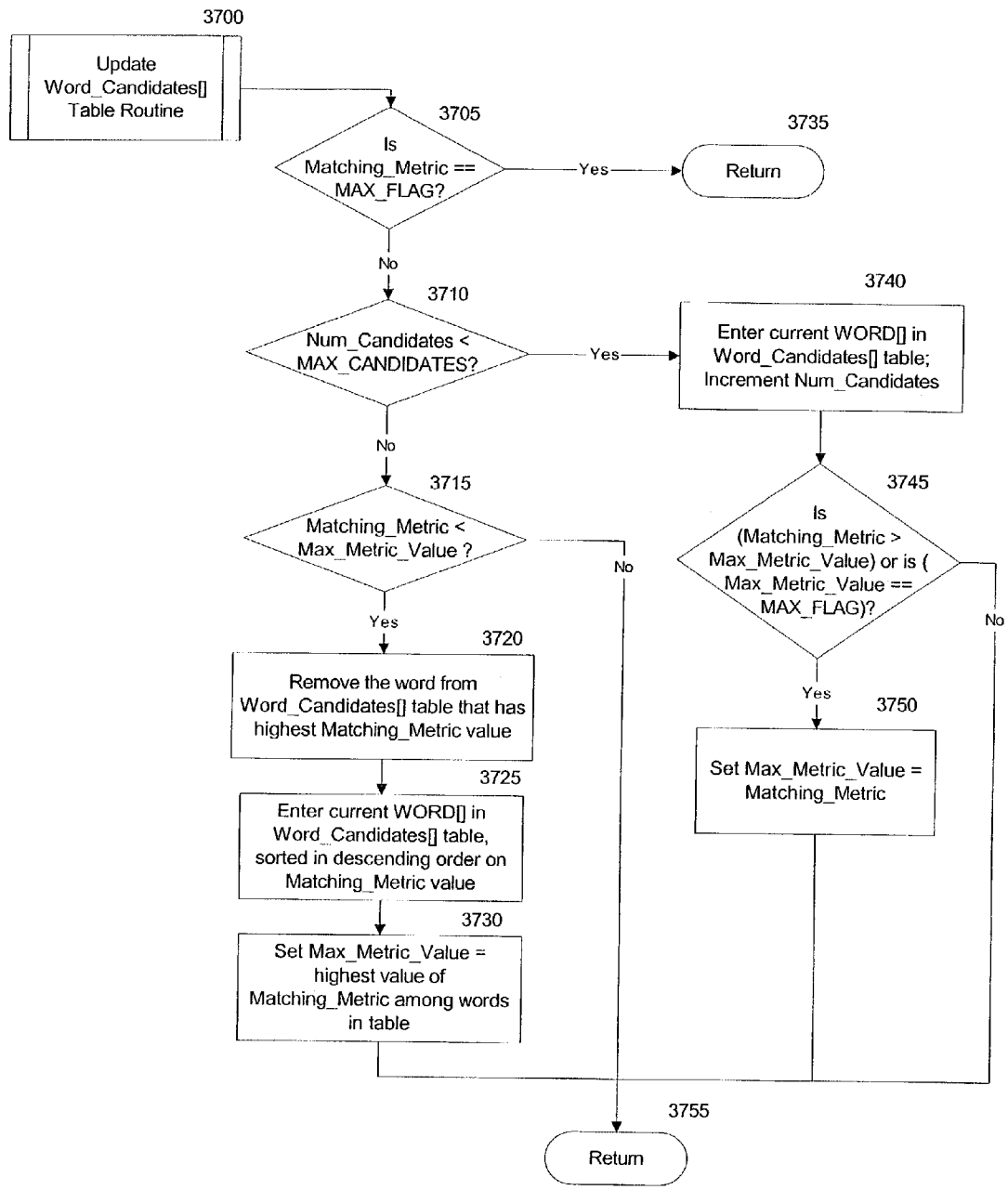
Figure 3H:
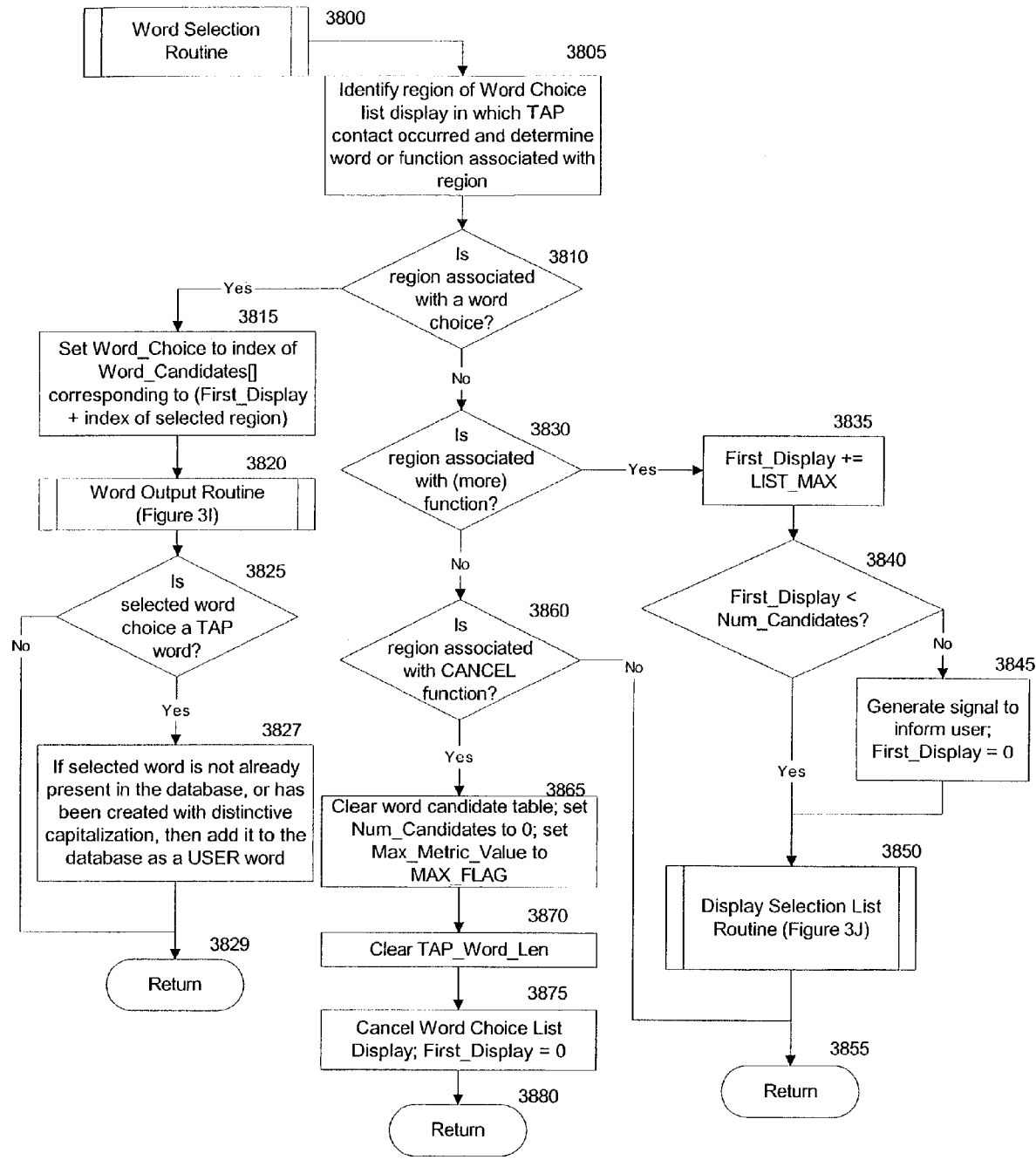
Figure 3I:
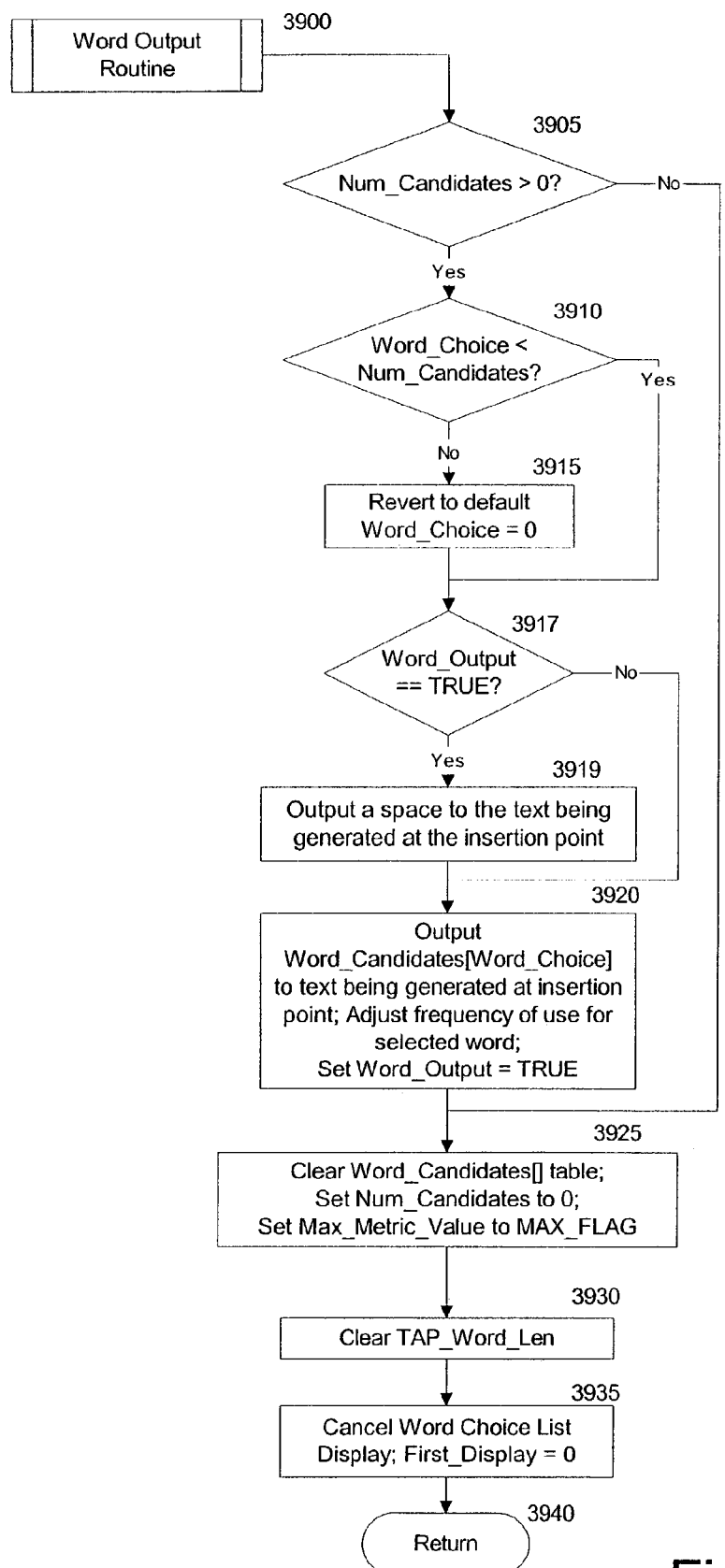
Figure 3J:
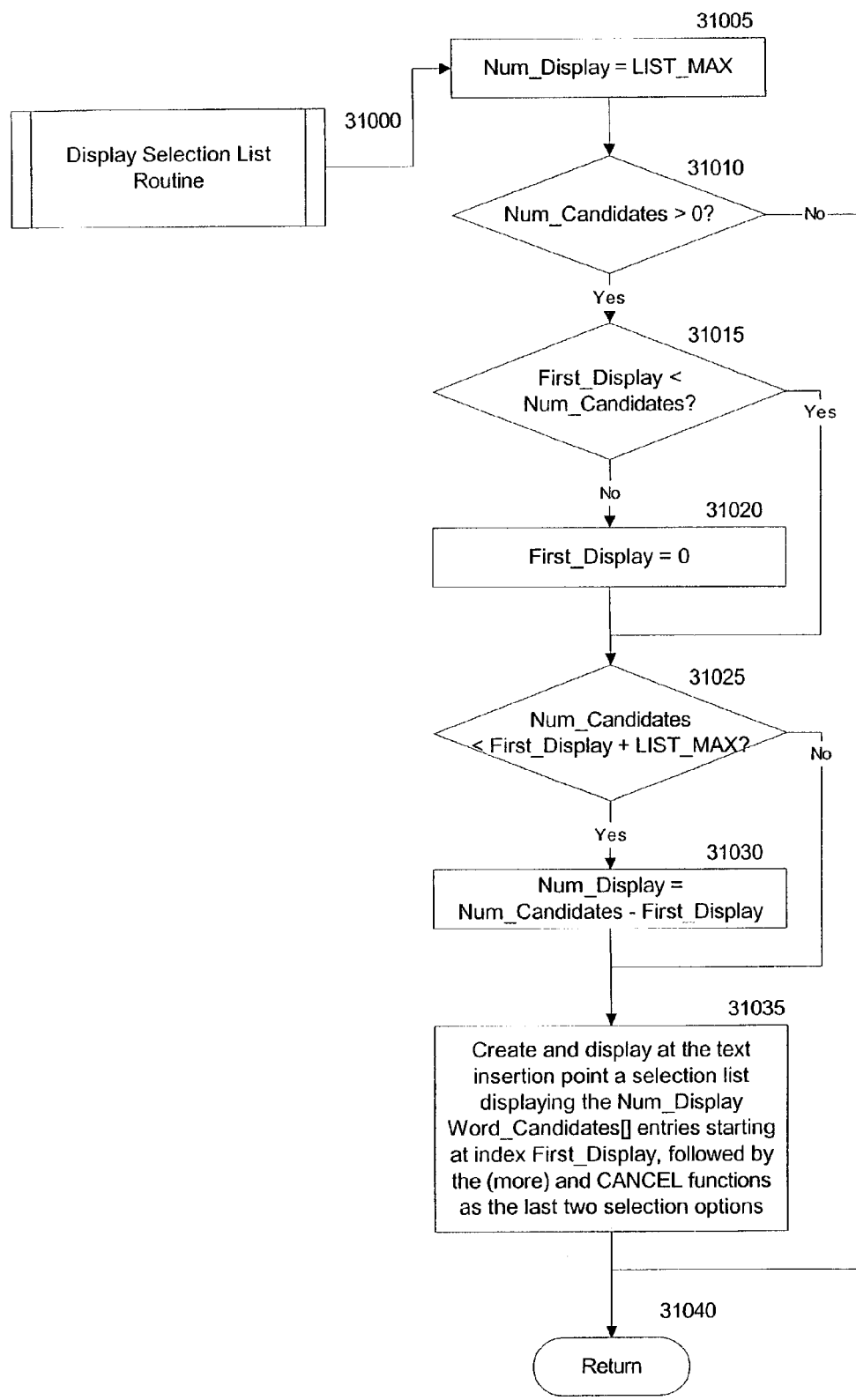

FIGS. 3A through 3J show a process flow chart of a preferred embodiment of software 162 to implement the Method for Continuous Stroke Word-Based Text Input that generates and manages a word selection list in response to the user contacting the screen and entering a continuous stroke input pattern or a tap contact. FIG. 3A shows a flow chart of a preferred embodiment of the Main Processing Routine 3100 of the Continuous Stroke Word-Based Text Input software 162. At block 3105, when the process is first started, various system variables are initialized. At block 3110, the process waits to be notified that a contact has occurred within the area of the keyboard 2104. When the operating system detects a contact in the keyboard area 2104, control returns to the Main Processing Routine 3100 at block 3115, where an Input Pattern Analysis Routine 3200 of FIG. 3B is invoked to analyze and classify the nature of the user's contact action. Once the contact action has been analyzed, a Pattern Matching Routine 3300 of FIG. 3C is invoked at block 3120 to determine what word candidates will be presented, what text is generated, or what function is invoked in response to the analyzed contact action. At block 3125, a Display Selection List Routine 31000 of FIG. 3J is called to generate a Word Choice list display to allow the user to select the intended word, if needed. Following the return from the Display Selection List Routine 31000, control returns to block 3110 where the process waits to be notified of the next contact action that occurs within the area of the keyboard 2104.

FIG. 3B shows a flow chart of a preferred embodiment of the Input Pattern Analysis Routine 3200. At block 3205, required variables are initialized, and arrays and corresponding indices used to store a smoothed input pattern data are cleared, along with an Inflection Point Table (IPT) in which the determined information about each identified inflection point is stored, such as its type, location, and time of occurrence. In one preferred embodiment, to reduce the number of calculations performed by the Pattern Matching Routine 3300, each inflection point entry in the IPT also includes an array IP_Distance[] that is filled in with the distance from the inflection point to each key of the keyboard that is associated with a letter. In another preferred embodiment, when the distance from an inflection point to a key of the keyboard exceeds a predetermined maximum threshold, the corresponding entry in the IP_Distance[] array is set to a unique MAX_DISTANCE flag value. In another preferred embodiment to further reduce the number of calculations performed by the Pattern Matching Routine 3300, each valid distance entry in the IP_Distance[] array for an inflection point is stored in the array as the distance multiplied by a weighting factor for the type of inflection point. Similarly, each inflection point entry in the IPT (except the first PEN_DOWN) includes an array Path_Distance[][2] that is filled in with the distance from each key of the keyboard that is associated with a letter to the closest point on the preceding input path segment (between the preceding inflection point and the current inflection point), here again multiplied by the weighting factor PATH_WEIGHT determined for a distance measured from a path segment (or to the MAX_DISTANCE flag value if this distance is greater than a corresponding maximum threshold distance for path segments). Also, for each entry in Path_Distance[][0] that is set to a valid distance value, Path_Distance[][1] is set to an ordinal value that indicates the sequential position along the input path segment of the point from which this distance was measured, relative to the points from which distances to other valid keys along the path segment were measured. In order for two adjacent letters in a candidate word to be matched with the same path segment, the ordinal value for the second letter must be greater than that for the preceding letter. This requirement prevents two adjacent letters of a word from being matched with a path segment when in fact the positions of the keys with which they are associated are reversed with respect to the direction of motion of the stylus along the input path. In this fashion, at block 3210, the first contact location received is recorded as the first (PEN_DOWN) inflection point in the IPT.

Next, at block 3215, the process waits to determine whether the contact location exits from the region associated with the key in which the first contact location occurred, or whether the stylus is lifted and contact with the screen is terminated prior to exiting from the key, in which case execution proceeds to block 3220 where a single inflection point of type TAP is entered in the IPT and the routine terminates at block 3225. Also, in another preferred embodiment, although not shown in FIG. 3B, when the process detects at block 3215 that the point of contact has not exited from the key in which contact first occurred, and the contacted key is associated with one or more alternate letter forms, and a predetermined threshold of time has elapsed since the contact was initiated, a single inflection point of type TAP_AND_HOLD is entered in the IPT, and control returns from the Input Pattern Analysis Routine without waiting for the contact to be lifted from the touch-screen. When the Pattern Matching Routine receives and processes a TAP_AND_HOLD inflection point, a "pop-up list" of the alternate letter forms associated with the key is displayed, and the process waits until the user slides the point of contact to a desired alternate form of the letter in the list, lifting the stylus to select the alternate form as the tap location letter. A flag is then set so that this alternate letter form is then added to the tap location word (as shown in FIG. 3F), and if TAP_Word_Len is currently set to 0, the selected alternate letter form also becomes the default one-letter word in the word choice list. This enables the user to easily create any desired sequence of letters in spelling a new word, including alternate letter forms, without having to change the mode of the keyboard.

If at block 3215 the contact point exits from the initial key contacted (or a DOUBLE_LETTER gesture is detected), then at block 3230 a Word Output Routine 3900 (shown in FIG. 3I) is invoked to output the default word choice if there is a pending selection list currently displayed from a preceding input pattern. Then at block 3233, the sequence of all raw unprocessed data points collected up to that time from the touch-screen are processed by an appropriate smoothing algorithm to create a smoothed sequence of data points that is appended to the Input Pattern data buffer, and at block 3235, first and second order differences are calculated, and in particular, the sum of the absolute magnitudes of the x- and y-second order differences is appended to a separate Input Pattern data buffer. Then at block 3240, the process determines if a DOUBLE_LETTER gesture was detected in the sequence of data just processed. If so, at block 3245, the approximate center of the gesture is determined and added to the IPT as a DOUBLE_LETTER inflection point at block 3250 and 3255 as described above. Also at block 3250, each time an inflection point is added to the PT, the weighting factor for the type of the inflection point is summed into the variable IP_Weight which is used in calculating the Matching_Metric value for each candidate word.

Then at block 3260, the process determines if a ROW_CHANGE inflection point can be identified along the preceding input path segment, and if so, one is added to the IPT in the manner previously described. In this case, the previously determined path segment is split into two segments, one before and one after the newly identified ROW_CHANGE inflection point. The previously determined Path_Distance[][] entries are accordingly reassigned to the new Path_Distance[][] array for entries that follow the location of the ROW_CHANGE inflection point.

At block 3265, the process determines whether all input path data has been processed up through the location where the stylus was lifted from the touch-screen, and if so, at block 3295 the final PEN_UP inflection point is added to the IPT in the manner previously described, and at block 3298, a final check is performed to determine whether a ROW_CHANGE inflection point can be identified along the final input path segment.

If no DOUBLE_LETTER gesture was detected in the sequence of data at block 3240, then at block 3270 the process determines whether at some point in the analyzed sequence of data, the sum of the absolute magnitudes of the x- and y-second differences exceeds a predetermined threshold. If so, then at block 3275, the process determines the point where the sum of the absolute magnitudes of the second differences attains its maximum value prior to falling back below the minimum threshold, and this point is then added to the IPT as an ANGLE_THRESHOLD inflection point in the manner previously described. Since a CANCEL gesture can in one sense be defined as three or more successive ANGLE_THRESHOLD inflection points entered at an accelerated speed, following the detection of each ANGLE_THRESHOLD inflection point, at block 3280 the process checks whether a CANCEL gesture has been entered. If so, at block 3285, a CANCEL signal is generated to inform the user that the CANCEL gesture has been recognized, the process waits for the stylus to be lifted from the touch-screen, and then the IPT and Input Pattern data buffer are cleared before returning to the Main Routine 3100. If no CANCEL gesture is detected at block 3280, the process proceeds to finish adding the ANGLE_THRESHOLD inflection point at block 3250, and proceeds as before for a DOUBLE_LETTER inflection point.

Following return from the call to the Input Pattern Analysis Routine 3200, at block 3120 in the Main Processing Routine 3100, the Pattern Matching Routine 3300 is called to process the results of the analysis of the input pattern. As shown in FIG. 3C, at block 3305 the word candidate table is cleared by setting Num_Candidates to zero, and Max_Metric_Value is initialized to a flag value MAX_FLAG, indicating that the word candidate table is still empty. Then at block 3307, the process checks whether a CANCEL gesture was entered, and if so, returns at block 3320 with the word candidate table still empty. If no CANCEL gesture was entered, then at block 3310 the process checks whether the inflection point table contains a single TAP inflection point, and if so, at block 3315 the Process TAP Inflection Point Routine 3600 is called to handle the detected TAP. Otherwise, at block 3325 the process identifies each unique ordered pair of keys such that the first key of each pair is located within a predetermined threshold MAX_DISTANCE from the PEN_DOWN inflection point, and the second key of each pair is located within MAX_DISTANCE from the PEN_UP inflection point. Then at block 3330, the process identifies the range of input path length classes that are associated with words in the database that can be considered to be potential matches with the input pattern based on its actual length as measured by the Input Pattern Analysis Routine and stored in the IPT. At block 3335, the variable MIN_LETTERS is set to the number of inflection points that must be matched with a letter, adjusted to account for DOUBLE_LETTER inflection points that must be matched with two letters. Similarly, N_DOUBLES is set to the number of DOUBLE_LETTER inflection points. Then the loop from block 3340 to block 3350 is executed for each ordered pair of keys identified at block 3325, where at block 3345 the group of words in the database is identified that corresponds to the current ordered pair of keys. Then the loop from block 3360 to block 3390 is executed for each word in the group of words identified at block 3345. At blocks 3365, 3370 and 3373, the process checks whether the word qualifies as a candidate based on its input path length class, the number of letters in the word, and the number of double letters in the word. If any of these qualifications are not met, then the word is skipped over and the next word is considered. In another preferred embodiment (not shown in FIG. 3C), each word in the database is also stored with an expected minimum number of inflection points based on the geometric relationship between the keys associated with sequence of letters that form the word's spelling. A candidate word does not qualify if fewer than the expected minimum number of inflection points are identified in the current input pattern. If the word meets all of the preliminary qualifications, then at block 3375 the word is copied to array WORD[] and WORD_Len is set to its length. At block 3380, a Matching_Metric Calculation Routine 3400 (shown in FIG. 3D) is called to calculate the Matching_Metric value for the current word. Then at block 3385, an Update Word_Candidates Table Routine 3700 (shown in FIG. 3G) is called to determine whether the calculated Matching_Metric value is good enough to qualify the current word to be provisionally added to the Word_Candidates[] table of the top matching word candidates identified in the database, and if so, to add it to the table. Once all of the identified qualifying candidate words have been evaluated, the routine returns at block 3355 to the Main Processing Routine 3100, where at block 3125 the Display Selection List Routine 31000 (shown in FIG. 3J) is called to display the identified word candidates in a selection list at or near the text insertion point on the text display 2106.

FIG. 3D shows a flowchart of a preferred embodiment of the Matching_Metric Calculation Routine 3400, called at block 3380 of the Pattern Matching Routine 3300. The process depicted in FIG. 3D determines whether it is possible to identify a valid matching between the inflection points (and, if necessary, path segments) of an input pattern and the keys associated with the letters of a candidate word. If such a matching is possible, the routine of FIG. 3D identifies an optimal or close to optimal matching so that a Set Matching_Metric Value Routine 3700 called at block 3475 can quickly and simply calculate the actual value of the Matching_Metric according to the identified matching arrangement.

This is a preferred embodiment of an algorithm to match the letters of a candidate word with a length of WORD_Len letters (stored in WORD[]) with the Number_of_Ips inflection points determined for an input pattern. At block 3405, since the first (PEN_DOWN) inflection point is always matched with the first letter of the word, and the last (PEN_UP) inflection point is always matched with the last letter, the variable IP_Index (used to step through each inflection point to be matched) is initialized to 1, and Last_IP (used to limit the number of inflection points processed) is initialized to (Number_of_IPs-1). Similarly, for indexing through the letters of WORD[], LTR_Index is initialized to 1 and Last_LTR is set to (WORD_Len-1). The variable Match_Lim is initialized to (WORD_Len-Number_of_IPs), and tracks how many of the following letters need to be considered as possible matching candidates for each inflection point as the algorithm proceeds. The arrays MATCH[], RECURSE[], and BACK_TRACK[][], and a variable RECURSION_LEVEL, are all initialized to zero, and track where the process needs to back-track when multiple solutions are found.

At block 3410, for each subsequent inflection point, the process determines how many of the following Match_Lim yet-unmatched letters are potential matches, and sets N_Match to this number. In order for a letter to be a potential match, the key associated with the letter must be within MAX_DISTANCE of the inflection point, and any preceding yet-unmatched letters must able to be matched with the preceding path segment in their proper sequence. If at block 3415 there are no possible matches, but at block 3417 it is determined that the current inflection point is a ROW_CHANGE inflection point (and therefore does not require to be matched with a letter), then at block 3463 MATCH[IP_Index] is set to a flag value ROW_CHANGE_SKIP, indicating that a ROW_CHANGE inflection point was left unmatched, and LTR_Index is decremented so that the subsequent increment at block 3465 restores it to its proper value (since the current letter was not yet matched with an inflection point). But if at block 3415 there are no possible matches, and at block 3417 it is determined that the current inflection point is not a ROW_CHANGE inflection point, and if at block 3420 RECURSION_LEVEL is set to zero, then the current word is not a candidate and the algorithm returns a failure code at block 3440. If it is determined at block 3450 that there is only one possible match, then at block 3460, Best_Match is set to the index of the matching letter and the match with the inflection point is recorded by setting MATCH[IP_Index] to Best_Match, and LTR_Index is set to Best_Match since all letters up through Best_Match have now been provisionally matched. At block 3465, LTR_Index is updated to the index following the letter that was matched with the preceding inflection point, and IP_Index is incremented to proceed to identify a match for the next inflection point. At block 3470, the value of Match_Lim is updated to account for any letters that have been matched with path segments so far, since each letter matched with a path segment reduces the number of letters that can possibly be matched with each subsequent inflection point. At block 3473, the process checks whether all inflection points and letters that need to be matched have already been matched, and if so, at block 3475 the Set Matching_Metric Value Routine 3700 is called to compute the numeric value of the Matching_Metric in accordance with the inflection point-to-letter pairing established in the MATCH[] array, and the routine returns success at block 3480.

If at block 3450 the process determines that the inflection point IP_Index can be successfully matched with more than one of the following Match_Lim yet-unmatched letters, then the best-matching letter (with index Best_Match) is provisionally matched with the inflection point. At block 3455, BACKTRACK[IP_Index][0] is set to (N_Match-1), one less than the number of yet-untried possible matching letters, the remaining potential matching letters are stored in BACKTRACK[IP_Index][1 . . . N_Match] in increasing order of best-match, RECURSE[RECURSION_LEVEL] is set to IP_Index, and RECURSION_LEVEL is incremented. This stores the remaining potential matches in BACKTRACK[], so that if the algorithm reaches a dead-end based on the provisional matching of the current inflection point with Best_Match, it can back-track to this point and try again by matching the inflection point with one of the other potential matches. Thus, at block 3415, if no potential matches are found for a subsequent inflection point, and at block 3420 RECURSION_LEVEL is not set to zero, then at block 3425, the process retrieves (and removes) from RECURSE[] and BACKTRACK[] the previously identified next-best match for the most recently identified inflection point with multiple matches, restoring IP_Index and LTR_Index to their appropriate values and working forward again from the point to try to find a valid, complete matching solution. At block 3430, the process determines whether the last of the stored potential matches have been removed from the currently active level of the BACKTRACK[] array, and if so, then at block 3435 RECURSION_LEVEL is decremented so that the algorithm will move forward (since all possible matches will have been tried at the current level). If the process determines a possible match for each inflection point, the algorithm moves to termination at block 3473 even if RECURSION_LEVEL is greater than zero (indicating that there may in fact be other possible, and potentially better, solutions). Since at each point the algorithm 3400 first chooses the best match for each inflection point with multiple possible matches, the first valid matching identified is likely to be an optimal matching, and in any case, the constraints placed on matching make it unlikely that multiple solutions, if they even existed, would have a significantly different matching metric value. In another preferred embodiment, the algorithm of FIG. 3D is modified so that it alternates between matching the next inflection point moving forward from the first PEN_DOWN inflection point, and moving backward from the last PEN_UP inflection point. In yet another preferred embodiment, any identified DOUBLE_LETTER inflection point (or points) is first matched the required occurrence (or multiple occurrences) of a double letter in the candidate word, and the algorithm of FIG. 3D alternately moves forward and backward from each of the a priori matched PEN_DOWN, PEN_UP, and DOUBLE_LETTER inflection points.

Once the Matching_Metric Calculation Routine 3400 has identified a valid pairing between the identified inflection points and the letters of a candidate word, it is straightforward to determine the actual numeric value of the Matching_Metric in the Set Matching_Metric Value Routine 3500 shown in FIG. 3E (called from block 3475 in the Matching_Metric Calculation Routine 3400). At block 3505, the value of Matching_Metric is initialized to the weighted distance between the initial PEN_DOWN inflection point and the first letter of the word. Total_Weight is initialized to the sum of the inflection point distance weights calculated by the Input Pattern Analysis Routine 3200 as each inflection point was originally identified, and Next_LTR is initialized to 1, the index of the next letter of the word to be matched. Then a loop from block 3510 through 3540 processes each of the remaining inflection points. At block 3515, if the current inflection point has been matched with the next letter to be matched, then at block 3530 the weighted distance of the current letter from the current inflection point is added to the sum being accumulated in Matching_Metric. If the current inflection point has not been matched with the next letter to be matched, then at block 3517, if it is found that the current inflection point is a ROW_CHANGE inflection point that has been skipped over (not matched with any letter), then at block 3527 Total_Weight is adjusted to account for the fact that the ROW_CHANGE inflection point was skipped in the matching for the current word, and execution continues at the end of the loop 3540 to move on to the next inflection point, i. If at 3517 it is found that the current inflection point is not a skipped ROW_CHANGE inflection point, then the current letter must have been matched with the preceding path segment, so at block 3520 the weighted distance of the current letter from the preceding path segment is added to the sum being accumulated in Matching_Metric, and Total_Weight is adjusted to account for the weighting applied to this distance. Then at block 3525, Next_LTR is incremented since the current letter has been accounted for, and at block 3515 the following letter is checked to determine if it has been matched with the current inflection point. Once all the inflection points have been processed, at block 3540 the loop terminates, and at block 3545 the final value of Matching_Metric is calculated by multiplying the calculated sum of weighted distances by a frequency adjustment factor, which in one preferred embodiment is calculated as (1+log(MAX_FREQ/WORD_Frequency))

where MAX_FREQ is the maximum possible frequency of use value that can be associated with a word in the database, and WORD_Frequency is the specific current value of the frequency of use that is associated with the current word. Finally at block 3545, the final value of Matching_Metric is normalized by dividing by the sum of all the weighting factors used in calculating the summed distance total, so that the final value is the average frequency-weighted distance of the letters of the word from the inflection points (and possibly path segments) of the current input pattern.

FIG. 3F shows a preferred embodiment of the Process TAP Inflection Point Routine 3600, called from the Pattern Matching Routine 3300 at block 3315. At block 3603, the process determines whether the TAP location occurred within the boundaries of a key that is associated with the generation of a letter. If so, then at block 3605 the process checks whether a tapped word has already been started, or whether this is the first tap of a potential new sequence of taps (i.e. TAP_Word_Len is currently set to 0). If TAP_Word_Len is 0, then at block 3610 the process identifies all one-letter words in the database that are associated with keys that are within MAX_DISTANCE of the identified TAP location. Then in the loop from block 3615 through 3630, the Matching_Metric value is calculated for each identified one-letter word, the word is stored in WORD[] and WORD_Len, and at block 3625, the Update Word_Candidates Table Routine 3700 is called to add each identified one-letter word at the proper place in the Word_Candidates[] table so that an appropriately prioritized selection list can be displayed.

If at block 3605 it is found that TAP_Word_Len is not set to 0 (and consequently this is the second or later TAP event in a sequence of letter-key TAPs), and likewise following the addition of one-letter words at block 3630, at block 3635 the process identifies the default letter associated with the key in which the TAP location occurred. At block 3640 this default letter is appended to the current TAP_WORD[] being formed, which at blocks 3645 and 3650 is appended to the current Word_Candidates[] list as a designated TAP word.

If at block 3603 the TAP location is not within a key associated with the generation of a letter, then at block 3660, the process determines if the TAP location occurred within the boundaries of a displayed Word Choice list, and if so, at block 3663 a Word Selection Routine 3800 is invoked to process the selection of a word or a word choice list function. If at block 3603 the TAP location is not within the Word Choice list, then at block 3670 the process determines whether the TAP location occurred within the boundaries of the BackSpace key, and if so, and if also at block 3673 TAP_Word_Len is found to be greater than 0, then at block 3675, TAP_Word_Len is decremented. If at block 3677 TAP_Word_Len is found to be still greater than 0, then processing continues as before at block 3645 to append the current TAP_WORD[] to the Word_Candidates[] list. If TAP_Word_Len is found not to be greater than 0 at block 3690 the BackSpace function is invoked to perform its normal word processing function (i.e. delete the character to the left of the text cursor or delete the highlighted chunk of text if one exists, and so on). Following that, at block 3693, Word_Output is set to FALSE since it is no longer appropriate to assume that the user would want a space automatically output prior to a next selected word.

If at block 3670 the TAP location is not on the BackSpace key, then at block 3680 the process determines whether the TAP location occurred within the boundaries of a key associated with a function that causes the default word of a selection list to be output, and if so, at block 3685 Word_Choice is set to its default value of 0 and at block 3687 the Word Output Routine 3900 is invoked to output the default word choice to the insertion point in the text output area. If the function found at block 3680 does not cause the default word to be output, then at block 3690 the function associated with the tapped key is invoked to perform its normal word processing function. Depending on the nature of the function invoked, at block 3693 the flag Word_Output is set to FALSE if it would not be appropriate to automatically output a space prior to a next selected word (for example, following the BackSpace function).

FIG. 3G shows a preferred embodiment of the Update Word_Candidates[] Table Routine 3700, called at block 3385 of the of the Pattern Matching Routine 3300, and at blocks 3625 and 3650 of the of the Process TAP Inflection Point Routine 3600. At block 3705, the value of Matching_Metric is examined to determine if it has been set to a flag value indicating that the current word could not be matched with the input pattern, and if so, the routine returns without adding a candidate word. If not, Num_Candidates is checked to determine whether the word candidates table has yet been filled with the maximum number of valid candidates, and if not the current word is automatically added to the Word_Candidates table at 3740, and at 3745 Matching_Metric is checked to determine whether the current value of Max_Metric_Value needs to be updated. If at block 3710 the Word_Candidates[] table has already been filled with a set of valid entries, then at block 3715 the value of Matching_metric for the current word is compared to Max_Metric_Value to determine if the current word is a better match than one (or more) words currently in database. If so, the word having the highest Matching_Metric value is removed from the Word_Candidates table at 3720, and at 3725 the current WORD[] is added to the Word_Candidates[] table, sorted in descending order according to the Matching_Metric value for each entry. At 3730, Max_Metric_Value is updated to reflect the new highest value of Matching_Metric within the Word_Candidates[] table. At block 3755, control returns to the caller.

FIG. 3H shows a preferred embodiment of the Word Selection Routine 3800, called at block 3663 of the Process TAP Inflection Point Routine 3600. At block 3805, the region of the Word Choice list display in which the TAP contact occurred is identified and the candidate word or list function associated with the region is determined. If at block 3810 the region is associated with a word, then at block 3815 the index variable Word_Choice is set to (First_Display+the index of the selected region), where First_Display contains the value of the index of the Word_Candidates[] array for the entry displayed in the top (default) row of the Word Choice list, so that Word_Choice is set to the index of the Word_Candidates[] array for the selected word. At block 3820, the Word Output Routine 3900 is called to output the selected word to the text display area 2106 at the insertion point 2108. At block 3825, the process determines if the selected word was a constructed TAP-location word, and if so, at block 3827, if the selected word is not already in the database, or if it has been created with distinctive capitalization, then it is added to the database as a User-Defined word. The routine then terminates at block 3829.

If at block 3810 the selected list region is not associated with a word choice, then if at block 3830 it is determined that the region is associated with the "(more)" function, then at block 3835, the index variable First_Display is incremented by the value LIST_MAX, the predetermined maximum number of words that are displayed in a fully-populated Word Choice list. If at block 3840 the incremented value of First_Display exceeds the total number of candidate words identified in the Word_Candidates[] array, then at block 3845 First_Display is set to 0, and a signal (such as a distinctive beep) is generated to inform the user that the Word Choice list has cycled through all of the possible candidates and has returned to the start of the list. Then at block 3850 the Display Selection List Routine 31000 is called to display the new set of word candidates in an updated Word Choice list display. The routine then terminates at block 3855.

If at block 3830 the selected list region is not associated with the "(more)" function, then if at block 3860 it is determined that the region is associated with the "CANCEL" function, then at block 3835, then at block 3865 the Word_Candidates[] table is cleared, Num_Candidates is set to 0, and Max_Metric_Flag is set to the MAX_FLAG value, so that the Word_Candidates[] table is ready to have a new set of determined candidates added to it. Similarly, at block 3870 TAP_Word_Len is set to 0 so that a new TAP word can start to be constructed, and at block 3875, the Word Choice list display is canceled, and the display screen is refreshed to remove the previous Word Choice list display from the screen, and First_Display is re-initialized to 0. The routine then terminates at block 3880.

FIG. 3I shows a preferred embodiment of the Word Output Routine 3900, called from block 3230 of the Input Pattern Analysis Routine 3200, and at block 3687 of the Process TAP Inflection Point Routine 3600, and at block 3820 of the Word Selection Routine 3800. At block 3905, if the current Word_Candidates[] table contains at least one candidate, then at block 3910 the process confirms that the index Word_Choice points to a valid candidate, and, if not, at block 3915 Word Choice is reset to the default candidate index, 0. At block 3917, if the automatic spacing flag Word_Output is set to TRUE, then a space is output to the text insertion point at block 3919 prior to outputting the selected Word_Candidates[] table entry (as determined by the value of Word_Choice) at block 3920. Also, the frequency of use stored in the database is adjusted according to one of the algorithms for tracking word usage frequency that are well known in the art, and Word_Output is set to TRUE so that if a next word is subsequently output, a space will be automatically generated prior to the next word. Then at block 3925, where execution also resumes if the current Word_Candidates[] table is found to be empty at block 3905, the Word_Candidates[] table is cleared, Num_Candidates is set to 0, and Max_Metric_Flag is s to the MAX_FLAG value, so that the Word_Candidates[] table is ready to have a new set of determined candidates added to it. Then, at block 3930 TAP_Word_Len is set to 0 so that a new TAP word can start to be constructed, and at block 3935, the Word Choice list display is canceled, and the display screen is refreshed to remove the previous Word Choice list display from the screen, and First_Display is re-initialized to 0. The routine 3900 then terminates at block 3940.

FIG. 3J shows a preferred embodiment of the Display Selection List Routine 31000, called from block 3125 of the Main Processing Routine 3100, and from block 3850 of the Word Selection Routine 3800. At block 31005, Num_Display is initialized to LIST_MAX, the predetermined maximum number of words that are displayed in a fully-populated Word Choice list. If at block 31010 there are no candidates available to display, the routine returns from block 31040 without doing anything. If there is at least one candidate, then at block 31015 the index variable First_Display, which contains the value of the index of the Word_Candidates[] array for the entry to be displayed in the top (default) row of the Word Choice list, is checked to make sure that it has a valid value. If not, at block 31020 First_Display is set to 0, the index of the default candidate. At block 31025, the process determines whether there are enough word candidates beyond First_Display to create a full Word Choice list, and if not, at block 31030 Num_Display is reset to the number of available candidates. Finally, at block 31035 a Word Choice list is created and displayed at the text insertion point showing the Num_Display Word_Candidates[] entries starting at index First_Display, followed by the standard Word Choice list functions "(more)" and "CANCEL."

While the preferred embodiment of the invention has been illustrated and described, as noted above, many changes can be made without departing from the spirit and scope of the invention. Accordingly, the scope of the invention is not limited by the disclosure of the preferred embodiment.

What is claimed is:

1. A method of inputting alphabetic text to an electronic device having a virtual keyboard on a touch-sensitive screen, said virtual keyboard comprising a set of keys wherein each letter of the alphabet is associated with at least one key, the method comprising:

recording a contact action on the virtual keyboard, wherein the contact action includes an initial contact location, a path along which contact with the touch-sensitive screen continues, and a final contact location at which contact with the touch-sensitive screen is removed, forming an input stroke pattern according to said recorded contact action;

comparing said input stroke pattern with a set of words stored in a database;

identifying one or more words stored in the database wherein the first letter of the identified word is associated with a key that is at or near the recorded initial contact location, and wherein the last letter of the identified word is associated with a key that is at or near the recorded final contact location, and wherein any remaining letters of the word are each associated with keys that are on or near the recorded path of the contact location;

determining relative ranking of the identified one or more words according to the comparison; and offering one or more words of said determined relative ranking to the user for selection of the word to be input as text.

2. The method of claim 1, wherein said contact action includes moving said location of contact along the path of said contact action, and wherein said moving includes distinctly moving the location of contact when a desired word includes a letter that is repeated twice in succession.

3. The method of claim 2, wherein said distinctly moving includes moving in a circular motion on or near the key associated with the repeated letter.

4. The method of claim 2, further comprising repeating the distinctly moving for each additional repetition of the repeated letter when the desired word includes a letter that is repeated more than twice in succession.

5. The method of claim 2, wherein said distinctly moving includes moving one or more times in succession.

6. The method of claim 1, further comprising creating a tap input stroke pattern, when the point of contact is removed from the screen without being moved more than a threshold distance from the initial location of contact and without remaining in contact with the screen for more than a threshold time period.

7. The method of claim 6, further comprising:

comparing the tap input stroke pattern to a set of one-letter words stored in the database;

identifying one or more one-letter words that are acceptable based on the comparison;

determining relative ranking of the one or more one-letter words of said identified words according to the comparison; and offering one or more words of said determined relative ranked words to a user.

8. The method of claim 7, wherein when none of said determined ranked words are associated with keys that are less than a minimum threshold distance from said tap input stroke pattern, then none of said identified words are offered to the user.

9. The method of claim 7, wherein each detected tap input stroke pattern is associated with the letter displayed on the key within which the tap input pattern is detected.

10. The method of claim 9, further comprising creating a text string that is composed of the sequence of letters associated with the sequence of detected tap input stroke patterns when a sequence of two or more consecutive tap input stroke patterns are detected, and offering the created text string to the user.

11. The method of claim 10, further comprising displaying a list that includes one or more regions within each of which one of the letters associated with the key within whose boundaries the initial location of contact is located, when the point of contact is not moved more than a threshold distance from the initial location of contact and remains in contact with the screen for more than a threshold time period, and making the input stroke pattern a tap input stroke pattern that is associated with the letter associated with region from which the point of contact is removed when the user moves the point of contact to one of said regions in said list and removes the point of contact.

12. The method of claim 10, wherein when said text string is selected by the user as the word to be input as test, and when said word is not yet present in said database of words, said word is automatically added to said database.

13. The method of claim 1, wherein while the user is contacting the screen to enter a word and the user determines that the entered path of the point of contact does not correspond to the user's desired word, moving the point of contact in a distinctive manner to indicate that the current input stroke pattern is to be canceled, and wherein when the system identifies said distinctive manner of movement of the point of contact, no matching words are identified for said input stroke pattern including said distinctive manner of movement of the point of contact and no words are offered to the user for selection.

14. The method of claim 13, wherein the distinctive manner in which the point of contact is moved comprises a back and forth movement of the point of contact a threshold number of times, where the point of contact is moved faster than a threshold speed.

15. The method of claim 14, wherein the threshold speed is determined to be a threshold percentage faster than the fastest speed of movement of the point of contact measured within an input pattern for which an offered matching word is accepted for output by the user.

16. The method of claim 13, wherein when the system recognizes said distinctive manner of movement of the point of contact, providing a signal to the user indicating that said distinctive manner of movement has been detected and that no words will be offered to the user for selection in response to the current input stroke pattern.

17. The method of claim 1, wherein the arrangement of keys in said virtual keyboard is that of the traditional "QWERTY" layout.

18. The method of claim 17, wherein the width of certain keys in said virtual keyboard is increased relative to other keys.

19. The method of claim 1, wherein said comparing includes comparing said input stroke pattern with a sequence of locations of the keys associated with the sequence of letters comprising one of the words stored in the database.

20. The method of claim 19, further comprising determining a sequence of points of inflection along the path of said input stroke pattern, wherein each point of inflection is matched with a key that is associated with at least one letter of the compared word, wherein the points in the path occur in the same sequence as the associated letters occur in the sequence of letters comprising said compared word.

21. The method of claim 20, wherein an average value of distances from each determined point of inflection along the path to each corresponding matched key is used in calculating a matching metric to determine if the compared word is acceptable based on how closely the input stroke pattern matches the sequence of locations of the keys associated with the sequence of letters of said word.

22. The method of claim 21, further comprising calculating the matching metric from an average value of squared distances from each determined point along the path to each corresponding matched key.

23. The method of claim 21, wherein the distance to the key associated with any letter in the sequence of letters of the compared word that is not matched with a point of inflection is measured from the nearest point along the input stroke pattern that lies between the points from which the distances are measured to the keys associated with the letters immediately preceding and following the unmatched letter in the sequence of letters comprising the compared word, and wherein said distance is included in calculating the average value used in calculating said matching metric.

24. The method of claim 21 or claim 23, wherein when the distance from the key associated with the letter in the compared word to each matched point in an input stroke pattern exceeds a maximum threshold distance, the compared word is eliminated as a candidate to match the input stroke pattern.

25. The method of claim 21, wherein a plurality of types of points of inflection are identified.

26. The method of claim 25, wherein one of the plurality of types of points of inflection corresponds to a point determined at or near the initial contact location.

27. The method of claim 25, wherein one of the plurality of types of points of inflection corresponds to a point determined at or near the final contact location.

28. The method of claim 25, wherein said contact action includes moving said location of contact along the path of said contact action, and wherein said moving includes distinctly moving the location of contact when a desired word includes a letter that is repeated twice in succession, and wherein one of the plurality of types of points of inflection corresponds to a point determined at or near a location where the location of contact is distinctly moved.

29. The method of claim 25, wherein one of the plurality of types of points of inflection corresponds to a point, wherein the point is determined by recording the input stroke pattern as a sequence of points of contact, each of the points of contact being identified as a location on a two-dimensional coordinate plane, and identifying said point of inflection wherever the absolute value of a second order difference of one or both of the two-dimensional coordinates in the sequence of points of contact exceeds a determined threshold, and wherein said point of inflection is identified at or near a point where said absolute value of the second order difference of one or both of the two-dimensional coordinates reaches a local maximum.

30. The method of claim 25, wherein one of the plurality of types of points of inflection corresponds to a point, the point being along the segment of the input stroke pattern lying within a second horizontal row of keys at or near a point where the path of the input stroke pattern attains its maximum vertical distance from a first horizontal row of keys.

31. The method of claim 25, wherein said plurality of types of points of inflection are associated with weighting factors such that the distance of a key associated with a letter of said compared word that is matched with a point of inflection of a type associated with a relatively larger weighting factor has a correspondingly larger influence on a value calculated for said matching metric than the distance of a key associated with a letter of said compared word that is matched with a point of inflection of a type associated with a relatively smaller weighting factor.

32. The method of claim 25, wherein when a word is selected for output corresponding to an input stroke pattern, a difference is calculated between the location of each detected point of inflection and the location of the key associated with the letter in the output word with which the point of inflection was matched, wherein said difference is used to calculate a running average of said differences, and wherein said average difference is added to the location of each subsequently detected point of inflection to adjust the detected inflection point location, wherein the distance from an inflection point to the location of a key associated with a letter of a compared word is measured from said adjusted inflection point locations.

33. The method of claim 32, wherein said running average of said differences is calculated and added separately for the x-coordinate and the y-coordinate of each of said plurality of types of inflection point.

34. The method of claim 33, wherein said running average of said differences is calculated and added separately for positive and negative values of the second difference of the x-coordinate and the y-coordinate for one or more types of inflection point.

35. The method of claim 20, wherein the forming includes recording the input stroke pattern as a sequence of points of contact, each of the points of contact being identified as a location on a two-dimensional coordinate plane, and identifying a point of inflection wherever an absolute value of a second order difference of one or both of the two-dimensional coordinates in the sequence of points of contact exceeds a determined threshold, wherein said point of inflection is identified at or near a point where said absolute value of the second order difference of one or both of the two-dimensional coordinates reaches a local maximum, and wherein each said identified point of inflection is used as one of said determined sequence of points that is matched with a key that is associated with at least one letter of the compared word.

36. The method of claim 35, wherein the forming includes applying a smoothing algorithm to the sequence of points of contact before identifying the point of inflection.

37. The method of claim 35, wherein the first and second order differences of the two-dimensional coordinates calculated at each point along the input path are calculated with respect to two points at a fixed distance preceding and following the given point along the input path.

38. The method of claim 35, wherein wherever the input stroke pattern transitions from being within a first horizontal row of keys to being within a second horizontal row of keys and then returns to again lie within the first horizontal row of keys, and wherein no said point of inflection is identified according to the method of claim 31 along the segment of the input stroke pattern lying within said second horizontal row of keys, at least one additional point of inflection is identified along said segment of the input stroke pattern lying within said second horizontal row of keys at or near a point where the path of the input stroke pattern attains its maximum vertical distance from said first horizontal row of keys.

39. The method of claim 38, wherein said additional identified point of inflection is not matched with a key that is associated with a letter of said compared word when matching said sequence of determined points in the input stroke pattern with the keys associated with each letter of said compared word.

40. The method of claim 38, wherein horizontal and vertical components of the distance of a key associated with a letter of said compared word that is matched with a point of inflection are differentially weighted in computing the distance used in calculating the value for said matching metric.

41. The method of claim 35, wherein one or more of the words in the database are stored with an indication of the minimum number of points of inflection expected to be detected in an input stroke pattern corresponding to the word.

42. The method of claim 1, wherein the words in said database are stored in groups, wherein for each group of words, the first letters of all words in said group are associated with a single key of said virtual keyboard, and the last letters of all words in said group are associated with a single key of said virtual keyboard, said keys determining an ordered pair of keys uniquely associated with said group.

43. The method of claim 1, wherein one or more of the words in the database are stored with an indication of the frequency of use associated with the word, and wherein said frequency of use is used in determining which of the set of one or more words determined to most closely match the input stroke pattern is most likely to be the word intended to be input by the user, and wherein said determined set of words is presented to the user in order of decreasing likelihood.

44. The method of claim 1, wherein one or more of the words in the database are stored with an indication of the path length expected for an input stroke pattern corresponding to the word.

45. The method of claim 44, wherein the path length expected for an input stroke pattern corresponding to a word is calculated as the sum of the distances between the centers of the keys associated with the letters of the word in sequence.

46. The method of claim 1, wherein the word determined to most closely match the input stroke pattern is presented to the user as a default word choice selection.

47. The method of claim 46, wherein the word presented to the user as a default word choice selection is automatically accepted for output unless the user performs an explicit action to select an alternate word choice.

48. The method of claim 1, wherein each time a word is accepted for input as text immediately following a previously input word, a space is automatically generated between said previously input word and said immediately following word accepted for input.

49. The method of claim 1, wherein the forming said input stroke pattern includes creating a path comprised of contact point locations which connect in sequence the locations of the keys associated with the sequence of letters of a previously output word, wherein the identifying a set of one or more words includes excluding said previously output word that most closely matches said input stroke pattern, and the offering includes presenting one or more highest ranked words to the user for selection of the word to replace said previously output word in the output text.

50. The method of claim 49, wherein a smoothing process is first applied to said created input stroke pattern prior to comparing it with the set of words stored in the database.

51. An apparatus comprising:
   a touch-sensitive screen for presenting a keyboard device, said virtual keyboard includes a set of keys wherein each letter of the alphabet is associated with at least one key;
   an output device;
   a database for storing words; and
   a processor coupled to the touch-sensitive screen, the output device, and the database, the processor comprising:
      a first component for recording a contact action on said virtual keyboard, wherein the contact action includes an initial contact location, a path along which contact with the touch-sensitive screen continues, and a final contact location at which contact with the touch-sensitive screen is removed;
      a second component for forming an input stroke pattern according to said recorded contact action;
      a third component for comparing said input stroke pattern with the words stored in the database;
      a fourth component for identifying one or more words stored in the database wherein the first letter of the identified word is associated with a key that is at or near the recorded initial contact location, and wherein the last letter of the identified word is associated with a key that is at or near the recorded final contact location, and wherein any remaining letters of the word are each associated with keys that are on or near the recorded path of the contact location;
      a fifth component for determining relative ranking of the identified one or more words according to the comparison; and
      a sixth component for presenting one or more of the ranked words on the output device.

* * * * *